United States Patent [19]

Lee et al.

[11] Patent Number: 5,148,541

[45] Date of Patent: Sep. 15, 1992

[54] MULTILINGUAL DATABASE SYSTEM INCLUDING SORTING DATA USING A MASTER UNIVERSAL SORT ORDER FOR ALL LANGUAGES

[75] Inventors: Eddy Lee; Mervyn G. D'Cruz; Eugene Kulinek, all of Ontario, Canada

[73] Assignee: Northern Telecom Limited, Montreal, Canada

[21] Appl. No.: 481,642

[22] Filed: Nov. 3, 1989

Related U.S. Application Data

[63] Continuation of Ser. No. 133,768, Dec. 16, 1987, abandoned.

[30] Foreign Application Priority Data

Sep. 28, 1987 [CA] Canada ................................ 548048

[51] Int. Cl.⁵ .......................... G06F 7/08; G06F 15/40
[52] U.S. Cl. .............................. 395/600; 364/222.9; 364/282.1; 364/419; 364/DIG. 1
[58] Field of Search ... 395/600; 364/419, 200 MS File, 364/900 MS File

[56] References Cited

U.S. PATENT DOCUMENTS

| | | | |
|---|---|---|---|
| 3,947,825 | 3/1976 | Cassada | 364/900 |
| 4,365,315 | 12/1982 | Jamnik | 364/900 |
| 4,484,305 | 11/1984 | Ho | 364/900 |
| 4,595,980 | 6/1986 | Innes | 364/200 |
| 4,615,002 | 9/1986 | Innes | 364/200 |
| 4,623,985 | 11/1986 | Morimoto et al. | 364/900 |
| 4,703,425 | 10/1987 | Muraki | 364/419 |
| 4,731,735 | 3/1988 | Borgendale et al. | 364/200 |
| 4,733,368 | 3/1988 | Morimoto et al. | 364/900 |
| 4,939,639 | 7/1990 | Lee et al. | 364/200 |
| 4,991,087 | 2/1991 | Burkowski et al. | 364/200 |
| 5,060,146 | 10/1991 | Chang et al. | 364/900 |

*Primary Examiner*—Thomas C. Lee
*Assistant Examiner*—Ayni Mohamed
*Attorney, Agent, or Firm*—Robert C. Hogeboom; John E. Mowle

[57] ABSTRACT

A multilingual database system is disclosed in which data can be searched and retrieved by a user whether or not that data is in the user's own language. The data to be stored in the database is first encoded according to a master (or universal) sort order.

14 Claims, 15 Drawing Sheets

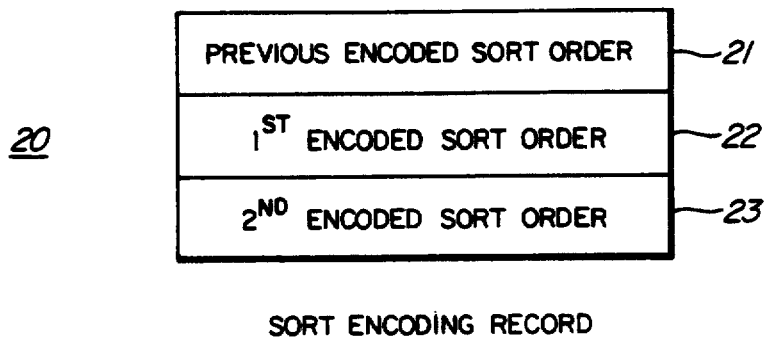
SORT ENCODING RECORD
FIG. IA
SORT ENCODING TABLE 24
FIG. IB

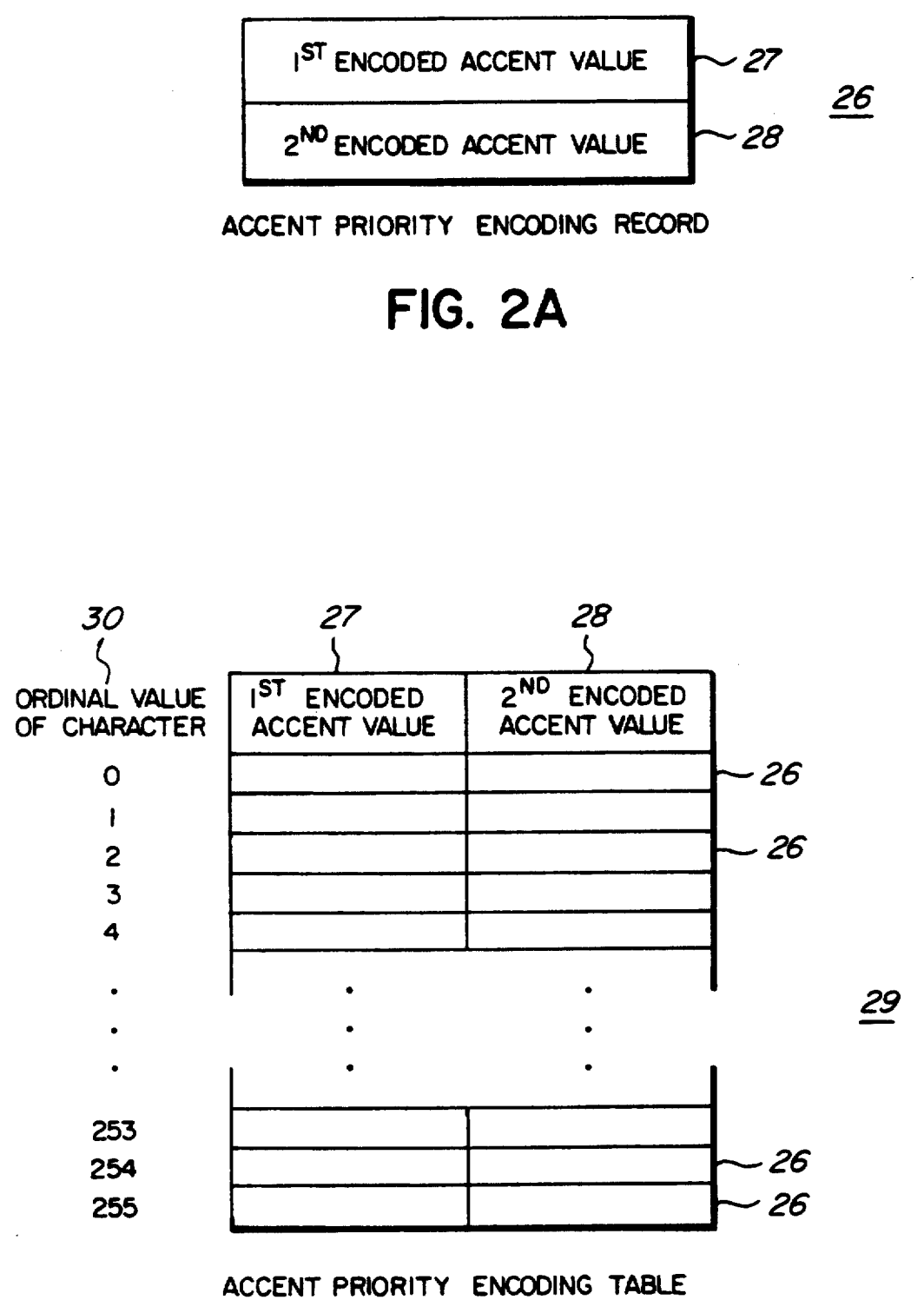

```
        ┌─────────────────────────┐
        │  1ST ENCODED ACCENT VALUE │──27
        ├─────────────────────────┤     26
        │  2ND ENCODED ACCENT VALUE │──28
        └─────────────────────────┘
```

ACCENT PRIORITY ENCODING RECORD

FIG. 2A

ACCENT PRIORITY ENCODING TABLE

FIG. 2B

MATCH ENCODING RECORD

MATCH ENCODING TABLE

| b8 | 0 | 0 | 0 | 0 | 0 | 0 | 0 | 0 | 1 | 1 | 1 | 1 | 1 | 1 | 1 | 1 |
| b7 | 0 | 0 | 0 | 0 | 1 | 1 | 1 | 1 | 0 | 0 | 0 | 0 | 1 | 1 | 1 | 1 |
| b6 | 0 | 0 | 1 | 1 | 0 | 0 | 1 | 1 | 0 | 0 | 1 | 1 | 0 | 0 | 1 | 1 |
| b5 | 0 | 1 | 0 | 1 | 0 | 1 | 0 | 1 | 0 | 1 | 0 | 1 | 0 | 1 | 0 | 1 |
| b4 b3 b2 b1 | 00 | 16 | 32 | 48 | 64 | 80 | 96 | 112 | 128 | 144 | 160 | 176 | 192 | 208 | 224 | 240 |
|---|---|---|---|---|---|---|---|---|---|---|---|---|---|---|---|---|
| 0 0 0 0  00 | | | SP | 0 | @ | P | ` | p | | | NBSP | ° | À | Ð | à | ð |
| 0 0 0 1  01 | | | ! | 1 | A | Q | a | q | | | ¡ | ± | Á | Ñ | á | ñ |
| 0 0 1 0  02 | | | " | 2 | B | R | b | r | | | ¢ | ² | Â | Ò | â | ò |
| 0 0 1 1  03 | | | # | 3 | C | S | c | s | | | £ | ³ | Ã | Ó | ã | ó |
| 0 1 0 0  04 | | | $ | 4 | D | T | d | t | | | ¤ | ´ | Ä | Ô | ä | ô |
| 0 1 0 1  05 | | | % | 5 | E | U | e | u | | | ¥ | µ | Å | Õ | å | õ |
| 0 1 1 0  06 | | | & | 6 | F | V | f | v | | | ¦ | ¶ | Æ | Ö | æ | ö |
| 0 1 1 1  07 | | | ' | 7 | G | W | g | w | | | § | · | Ç | × | ç | ÷ |
| 1 0 0 0  08 | | | ( | 8 | H | X | h | x | | | ¨ | , | È | Ø | è | ø |
| 1 0 0 1  09 | | | ) | 9 | I | Y | i | y | | | © | ¹ | É | Ù | é | ù |
| 1 0 1 0  10 | | | * | : | J | Z | j | z | | | ª | º | Ê | Ú | ê | ú |
| 1 0 1 1  11 | | | + | ; | K | [ | k | { | | | « | » | Ë | Û | ë | û |
| 1 1 0 0  12 | | | , | < | L | \ | l | \| | | | ¬ | ¼ | Ì | Ü | ì | ü |
| 1 1 0 1  13 | | | - | = | M | ] | m | } | | | SHY | ½ | Í | Ý | í | ý |
| 1 1 1 0  14 | | | . | > | N | ^ | n | ~ | | | ® | ¾ | Î | Þ | î | þ |
| 1 1 1 1  15 | | | / | ? | O | _ | o | | | | ¯ | ¿ | Ï | ß | ï | ÿ |

FIG. 9

MULTILINGUAL DATABASE SYSTEM INCLUDING SORTING DATA USING A MASTER UNIVERSAL SORT ORDER FOR ALL LANGUAGES

This application is a continuation application of Ser. No. 07/133,768, filed Dec. 16, 1987, now abandoned.

This invention relates generally to computer databases, and more particularly to a multilingual ordered data retrieval system (i.e. a database).

BACKGROUND OF THE INVENTION

To date, the most widely used code standard for alphanumeric characters has been ASCII (American Standard Code for Information Interchange) which is a 7-bit binary code standardized by ANSI (American National Standards Institute). As the only letters that ASCII supports are the English letters, its implementation in information processing and interchange environments has been limited to English. As a result, a large number of computer systems today communicate in the English language only.

In recent years, the computer industry has recognized the need to support the non-English Latin-based languages in order to facilitate communication with a non-technical user who often is familiar with only his native language. Hence, a new 8-bit multilingual character set was defined by ISO (International Standards Organization) in 1986. That set has already gained a broad support from the industry and various national standard organizations. The name of the character set is Latin Alphabet #1 and it has been documented in the ISO Standard as ISO 8859/1. It supports 14 Western European and Western Hemisphere languages that are used in 45 countries around the world.

The set of languages and characters supported by the ISO standard ISO 8859/1—"Information Processing—8 bit single byte coded graphic character sets—Part 1: Latin Alphabet #1" is believed to include most of those that are used in North America, Western Europe and Western Hemisphere. They are listed below:

Danish, Dutch, English, Faeroese, Finnish, French, German, Icelandic, Irish, Italian, Norwegian, Portuguese, Spanish and Swedish.

These languages are believed used in at least the following countries:

| | | |
|---|---|---|
| Argentina | Finland | Panama |
| Australia | France | Paraguay |
| Austria | Germany | Peru |
| Belgium | Guatemala | Portugal |
| Bolize | Guyana | El Salvador |
| Bolivia | Honduras | Spain |
| Brazil | Iceland | Surinam |
| Canada | Ireland | Sweden |
| Chile | Italy | Switzerland |
| Colombia | Liechtenstein | The Netherlands |
| Costa Rica | Luxembourg | UK |
| Cuba | Mexico | USA |
| Denmark | New Zealand | Uruguay |
| Ecuador | Nicaragua | Venezuela |
| Faroe Islands | Norway | |

Returning now to the ASCII Character set, the main advantage embodied by the English language with regard to sorting is that the alphabetical order of the letters in the English alphabet corresponds to the internal numerical collating sequence in the ASCII set. This special feature makes the sorting of English language strings relatively simple and in most cases efficient.

For example, to sort two characters, the following operations are performed:

1) Convert the cases of both characters into the same one (i.e. the characters become caseless).

2) Use straight comparison of codes (ordinal values) of both characters to determine the relative sort orders. The character whose ordinal value is smaller is collated first (in ascending order sorting).

The main advantage embodied by the English language alphabet (i.e. A to Z, no accented characters) with regard to data retrieval is that the matching process is basically unique (i.e. one-to-one mapping for all characters). In addition, as mentioned above, the ASCII sequences of the characters correspond to their sort order and hence alphabetically sorted data retrievals can be done relatively easily.

In addition, the full repertoire of the ASCII character set is normally represented in most cases by the users' terminals and hence problems of retrieving characters outside the keyboard repertoire does not normally arise.

In general, to insert a text string into an ordered database in ASCII, the following operations are performed:

1) Case conversion is done for the text string. This step is necessary for both upper and lower case versions of the same character to sort and match identically.

2) Use straight comparison of codes (ordinal values) of the case-converted text string against those existing in the database so as to find out the right insertion spot.

The retrieval operation usually goes through the following steps:

1) Find the matches based on the case-converted search key. The matches can be multiple and depends on whether the retrieval is by a unique key or associated with wildcard characters (e.g. find all entries beginning with "A").

2) Matched entries will be extracted and displayed to the user in sorted order since the data is stored in sorted order.

Limitations

Following are some limitations of the present approach used in data retrieval:

1) Most, if not all, data retrieval and storage algorithms published so far assume that the underlying character set is the 7-bit US ASCII set (or in some rare cases, the EBCDIC set) which does not support foreign letters. As a result, these algorithms are not capable of retrieving properly the non-English Latin-Based languages (strings).

2) The existing insertion methods for ordered data stores for English and other languages cannot handle sorting properly when foreign letters are included. The problem of dealing with foreign letters in sorting comes up when multilingual character sets are supported in an ordered data store since those sets contain more letters than those that are used domestically. In addition, the collating sequence of the multilingual character sets does not usually correspond to the sort order of all the supported languages.

3) The existing retrieval algorithms cannot properly handle sorted data retrievals in a multilingual environment in which information from the same data store can be accessed by users using different languages. This implies sort order and retrievals should depend on the users' languages.

Issues with Multilingual Data Retrieval

The support of multilingual data retrieval creates a wide range of issues that must be resolved in order to set up a functional, useful and friendly data retrieval system (i.e. database). Some of the issues are listed in the following subsections and will be dealt with individually in later sections. Throughout this document, examples will be presented using Language 1 (similar to English), Language 2 (similar to Swedish), Language 3 (similar to German) and Language 4 (similar to French). The use of these hypothetical languages in examples will allow better representation of some of the linguistic requirements imposed by different languages.

Handling Foreign Letters

The ability to support foreign letters is a must in any multilingual computer system. The trend is towards systems with user interfaces that are easy to use and understand. Suppose a Language 1 user wants to send mail to Mr. Göran Steen (a Language 2 speaking user). We really cannot expect the sender to know that the ö has an umlaut over it, because:

1) Language 1 users are, in general, unfamiliar with Language 2 and hence do not realize that there is an umlaut over the ö.

2) Language 1 user's terminal probably cannot display ö, so it may be transliterated as "ö".

When a multilingual data store is being accessed there must be some means for users to match characters that cannot be input from their terminals or are outside the users' alphabet. The character "β" and the character pair "SS" are treated the same in terms of sorting for Language I users and hence "SS" should be able to match "β" which is unlikely to be supported by a Language 1 based terminal. The same principle applies to other sortwise equal characters like ("Æ" and "AE") and ("E", "É", "È", "Ê", and "Ë") for Language 1 users. This implies that matching would not be unique since "Eddy" would match both "Eddy" and "Éddy" (for a Language 1 user).

As pointed out above, some limitations are imposed by the user's terminal. In this document it is assumed that the user's terminal will support only the user's language. That is, all characters in the user's language can be input and displayed by his/her terminal. Moreover, it is assumed that the terminal will not be capable of entering characters outside the user's language. For example, a Language 1 user will be able to enter only the range "A" to "Z" and no accented characters.

Sorting/Searching in Multilingual Ordered Data Storage Systems

To handle multilingual sorting and searching properly, the following issues should be addressed.

1) The collating sequence of letters in the Latin Alphabet #1 (or any other multilingual set) does not correspond to the alphabetical order of the letters in all the supporting languages. This means sorting can no longer rely on the collating sequence imposed by the character set.

2) The main idea of sorting in a multilingual environment is to have data sorted in the user's own language. The data stored does not have to be necessarily in the user's language and, in fact, it can be made of several different languages. Hence, a sorting operation is needed that is capable of supporting different sorting orders based on the users' languages. For example, the letter "Ä" is sorted after "Z" in Language 2 whereas it is sorted the same as an "A" in Language 3.

3) In some languages, there are cases where letters with different internal representation are sorted as if they had the same representation (e.g. "V" and "W" in Language 2 are collated the same). This undoubtedly creates a difficulty if one is thinking about using internal representation as a means to tackle the sorting problem.

4) The sorting software should be able to collate foreign letters correctly among the domestic letters. For example, "Ö" is sorted as "O" in Language 1. This kind of transliteration is definitely language dependent.

5) Characters that sort the same may not match each other in some instances. This implies that for ordered retrievals from an ordered data store, the retrieval process will differ from the insertion process.

One possible approach for a multilingual database would be to have one set of sorted database search keys (index) for each language supported. This approach has the disadvantage that it employs a relatively large amount of memory. It has the additional disadvantage that when updating is performed, each set of sorted database search keys must be updated; this involves more work than updating a single set.

SUMMARY OF THE INVENTION

The techniques set forth in the present invention allow the same algorithm (software) and data store to support any of the 14 languages listed earlier. The main reason this is possible is because the present invention uses a standard encoding scheme to encode insertion sort order keys and retrieval match keys for all the letters defined in the multilingual character set ISO 8859/1. This encoding scheme has an implicit language dependency and removes the dependency of the character set's internal collating sequence on sorting and matching operations.

The sorting methods of the present invention support the following features:

1) All characters that normally appear in a language (the alphabet for the language) will sort in the positions they normally occupy in that language. This means that accented characters used in the language may be sorted the same as corresponding unaccented characters or given unique sort positions in the alphabet.

2) To support the sorting of foreign letters, "transliteration" is used to ensure foreign letters are collated where users are most likely to expect to look for them based on geometrical or phonetic similarity:

a) For geometrical similarity the foreign letter sorts the same as the character in the user's alphabet that most closely resembles it. For example, "À", "Á", "Â", "Ã", "Ä" and "Å" will be sorted with "A" for Language 1 users.

b) Phonetic similarity (pronunciation) occurs when dissimilar geometric characters are regarded as being sortwise equal, usually for historical reasons. For example, the characters ("Æ" and "Ä"), and ("Ø" and "Ö") are sorted the in Language 2 because "Æ" and "Ø" are characters used in the alp of a neighbouring country that sound similar to Language 2 characters "Ä", "Ö", respectively.

3) Sorting operations must support one-to-two substitutions for some characters. For example, the "β" from Language 3 is sorted as though it were "SS" in Language 1.

4) Sorting operations must support two-to-two substitutions for some characters. For example, in Spanish the letter pairs "CH" and "LL" are sorted as if they were single letters and they are sorted between "CZ" and "D" and between "LZ" and "M" respectively.

5) Sorting operations must support accent priority. This priority comes into play when all the letters in the strings being compared are equal (same base character) except for the accents (e.g. A, Á, À). In this case, the ordering of the strings depends on the accent priorities associated with the characters in the strings (e.g. "Ellen" is sorted before "Éllen"). For example, in Language 4 the "A" vowels (with or without accent are treated as equal except for priority. Their priority order is: A, Á, À, Â, Ã, Ä, Å. Note that only one accent priority order is supported by the present multilingual data retrieval system but the methods can be extended to support multiple priority orders.

Note that this invention assumes that users are using terminals that can support only the characters in their native language. In other words, it is assumed that users cannot input the exact characters that are in the stored data unless the characters are also used in the user's language. This assumption is believed plausible; the purpose of a multilingual system is to support users from different countries and hence different language dependent terminals. Due to terminal restrictions, it may be difficult or even impossible for some users to enter or see foreign letters.

The matching rules provide the ability to support searching and matching of names containing foreign letters by using the user's own terminal. Some of the more common rules are:

1) Characters that are inside the user's alphabet (i.e. those characters on the user's keyboard) can only be matched by entering the exact same characters.

2) Foreign characters that are outside the user's alphabet will be matched according to the geometric and phonetic rules that were outlined in the previous section for sorting.

3) The scheme presented in this document will handle the above requirements, and can easily be modified to handle linguistic peculiarities of particular languages by minor modification of the tables used in the encoding process and/or by modification of the encoding algorithm.

As an example of the matching rules, for Language 1, the characters "Á", "À", "Â", "Ã", "Ä", and "Å" will be matched with by "A". On the other hand, only "Á", "Ã", "Ä", and "Å" are matched by "A" for Language 4 users because "À" and "Â" are in the Language 4 alphabet. As an example of phonetic matching, in Language 2, "Ä" will match "Ä" and "Æ", and "Ö" matches itself and "Ø".

The following are several advantages made possible by use of the present invention:

1) It is possible to retrieve data containing foreign letters using the user's native language.

2) Data is sorted at data entry time and hence no post-sorting is required after data retrieval. This means data is retrieved in sorted order based on the entered search key. Moreover, the sort order is good for the user's language, with foreign letters being assigned defined sort positions as explained in the sorting rules above.

3) Browsing of the entire data contents, regardless of size, according to the user's sort order is possible and relatively convenient. If post-sorting were required (which it is not), it would necessitate complicated file sorting techniques to be used since the data might not all fit into memory at the same time.

4) The implementation methods and features can be adopted to almost any existing data storage system architecture and with only a minor performance penalty.

The present invention is a multilingual database comprising a data store for storing multilingual data; an index of encoded sort keys, there being at least one sort key for each segment of data for each language to be supported by said data base, wherein the sort keys are ordered according to predetermined criteria and each sort key has associated therewith an indication of an entry in the data store with which it is associated. The predetermined criteria includes a master alphabetical sort order for all the languages supported by a multilingual character set and used in the database.

Stated in other terms the present invention is a method of operation for a multilingual ordered database having a data store for storing multilingual data, and an index of sort keys for facilitating access to said data store, method comprising the steps of: a) receiving information, in the form of words based upon characters from a multilingual alphabet, to be stored in the database; b) encoding, according to predetermined criteria, said words to form one sort key for each word for each language to be supported by the database, wherein each of said sort keys for each word for each language are different from each other, and dependent on language composition; c) storing the information in a known location in the data store; and d) storing the sort keys in sorted order in the index along with an indication of the known location of the corresponding information in the data store.

Stated in yet other terms, the present invention is a method of operation for a multilingual ordered database having a data store for storing multilingual data, and an index of index sort keys for facilitating access to the data store, the method, including the insertion of data into, and the extraction of data from, the database, comprising the following steps: a) accepting first input data to be stored in the database; b) storing the first input data in a known location in the data store; c) encoding at least a portion of the first input data via sort encoding tables, such that one index sort key is formed per language supported; d) inserting the index sort keys so formed into the index in numerical order along with an indication of the known location of the corresponding first input data in the data store; e) if other index sort keys stored in the index have the same numerical value as does a newly encoded index sort key, then the data corresponding to all the index sort keys having the same numerical value, is extracted from the data store and is encoded using an accent priority encoding table; f) all the index sort keys of step (e) are then sorted in the numerical order indicated by the accent encoding table and are then stored in the index in that order; g) accepting second input data, the presence of which is to be searched for in the database; h) encoding the second input data via a sort encoding table corresponding to the language of the user to produce a search sort key; i) comparing the search sort key with the index sort keys of the index to find any index sort keys in the index that are identical to the search sort key and extracting, as found data, data from the data store corresponding to any index sort keys that are identical to the search sort key; j) encoding at least a portion of each data entry extracted during step (i) and also encoding the second input data via a match encoding table corresponding to the language of the user to produce encoded match keys; k) comparing the match key corresponding to the second input data with the match keys corresponding to the found data to find any that are identical, and extracting data from the data store corresponding to any match keys from the found data that are identical to the match key corresponding to the second input data.

BRIEF DESCRIPTION OF THE DRAWINGS AND APPENDICES

The invention will now be described in more detail with reference to the accompanying drawings wherein like parts in each of the several figures are identified by the same reference character, and wherein:

FIG. 1A is a simplified block diagram depicting the record structure of the present invention for the sort encoding process;

FIG. 1B is a simplified block diagram depicting a sort encoding table for the present invention;

FIG. 2A is a simplified block diagram depicting the record structure of the present invention for handling the priorities of accents;

FIG. 2B is a simplified block diagram depicting an accent priority encoding table for the present invention;

Figure 6:
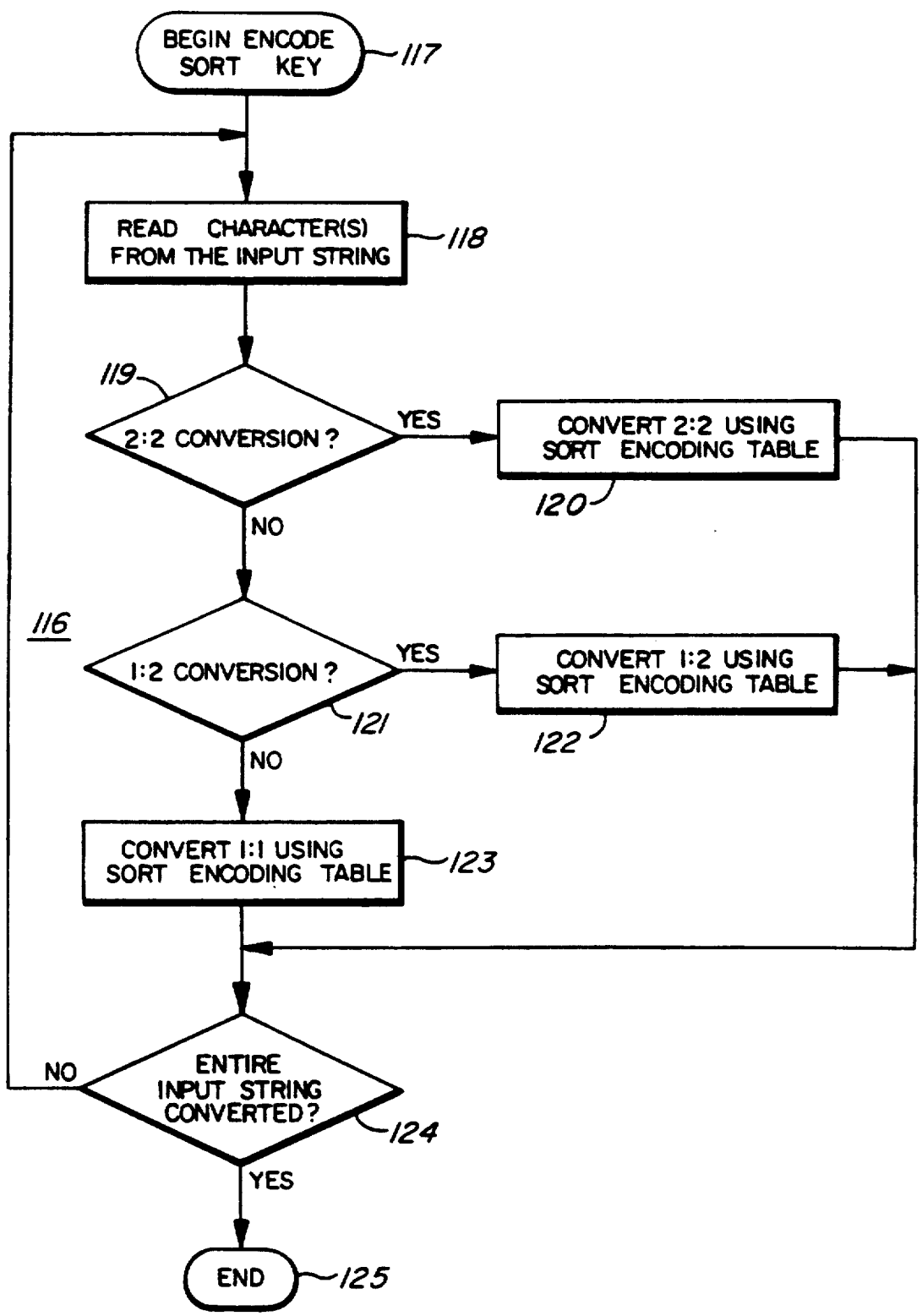
Figure 7:
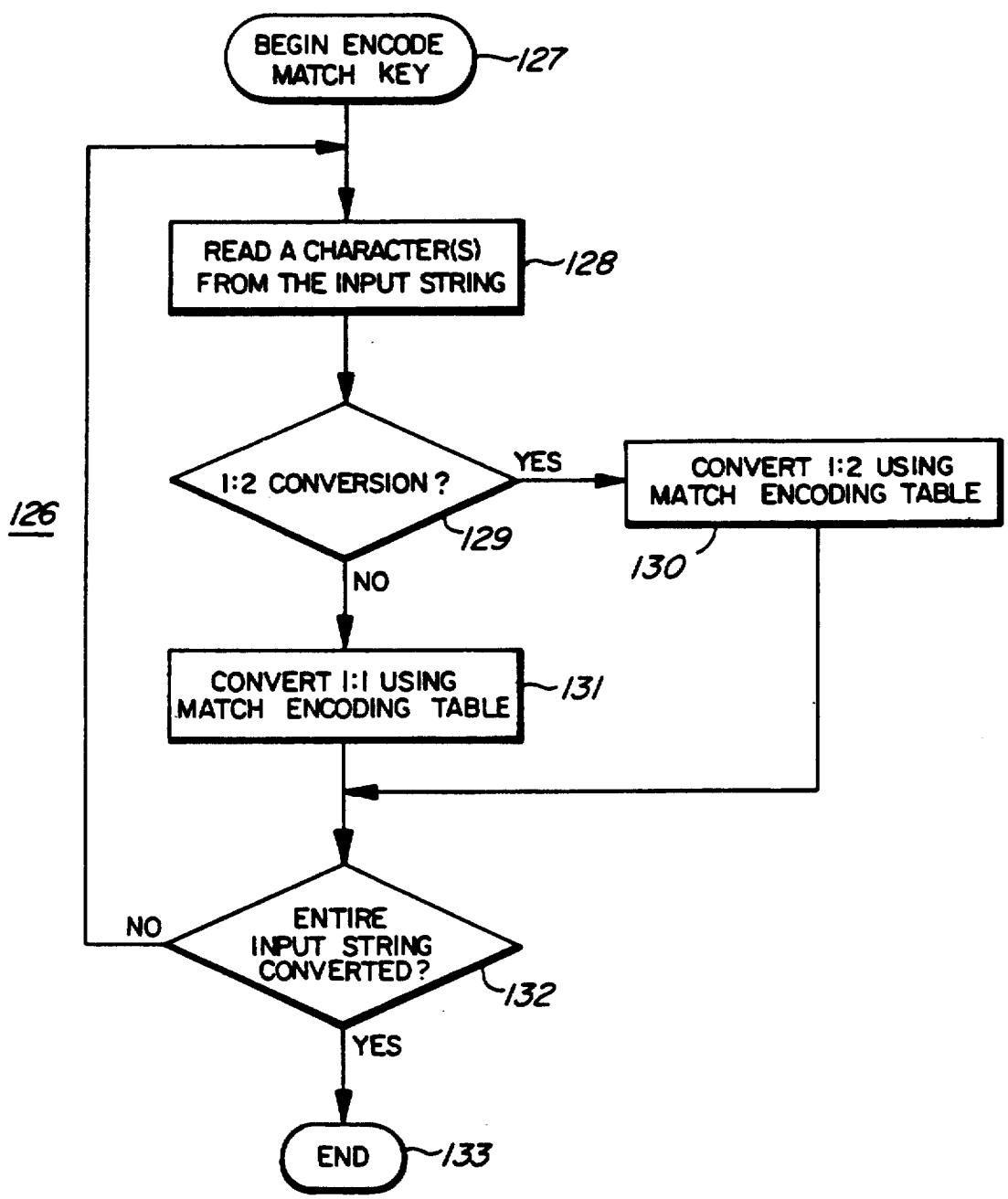
Figure 8:
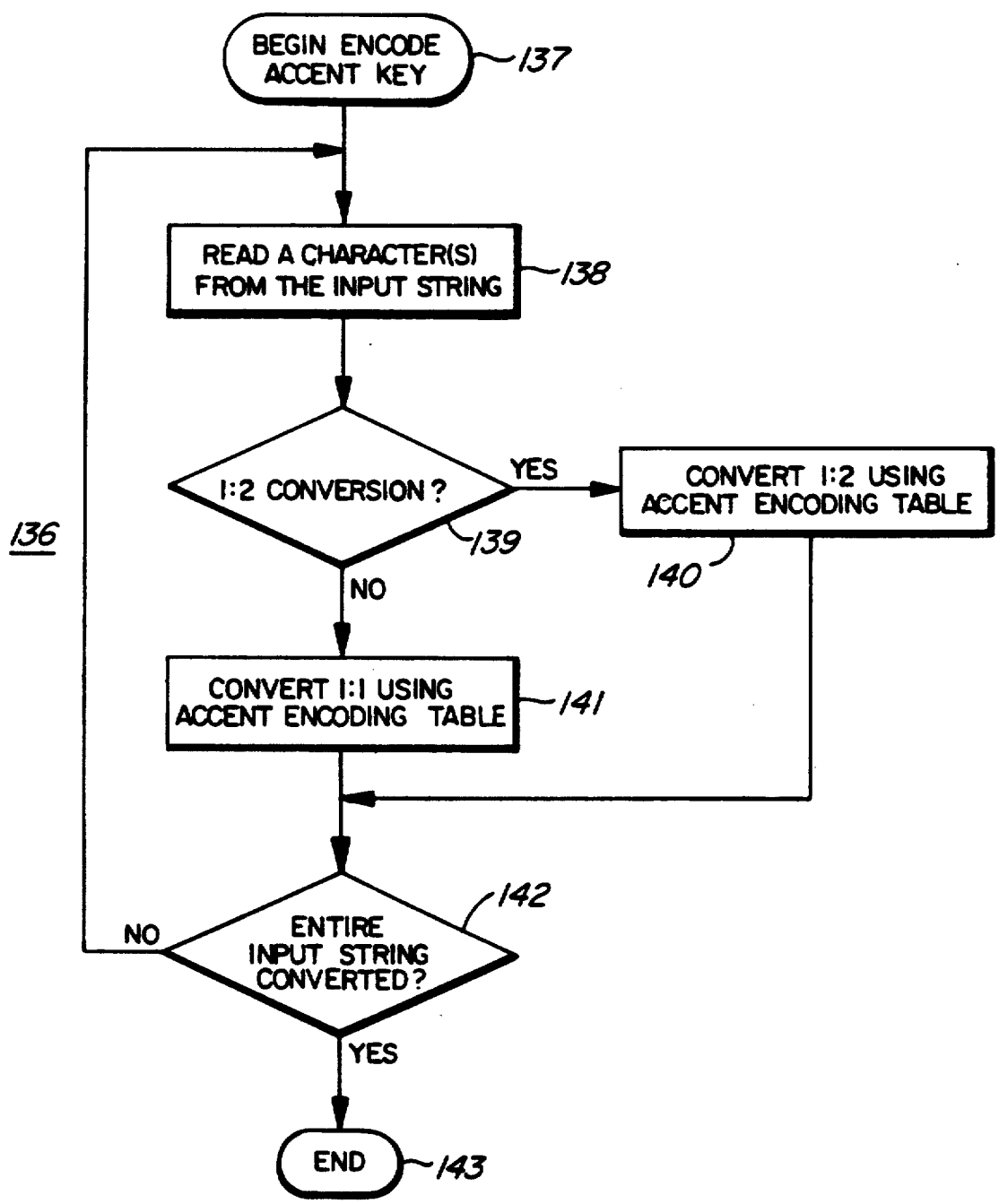
Figure 10:
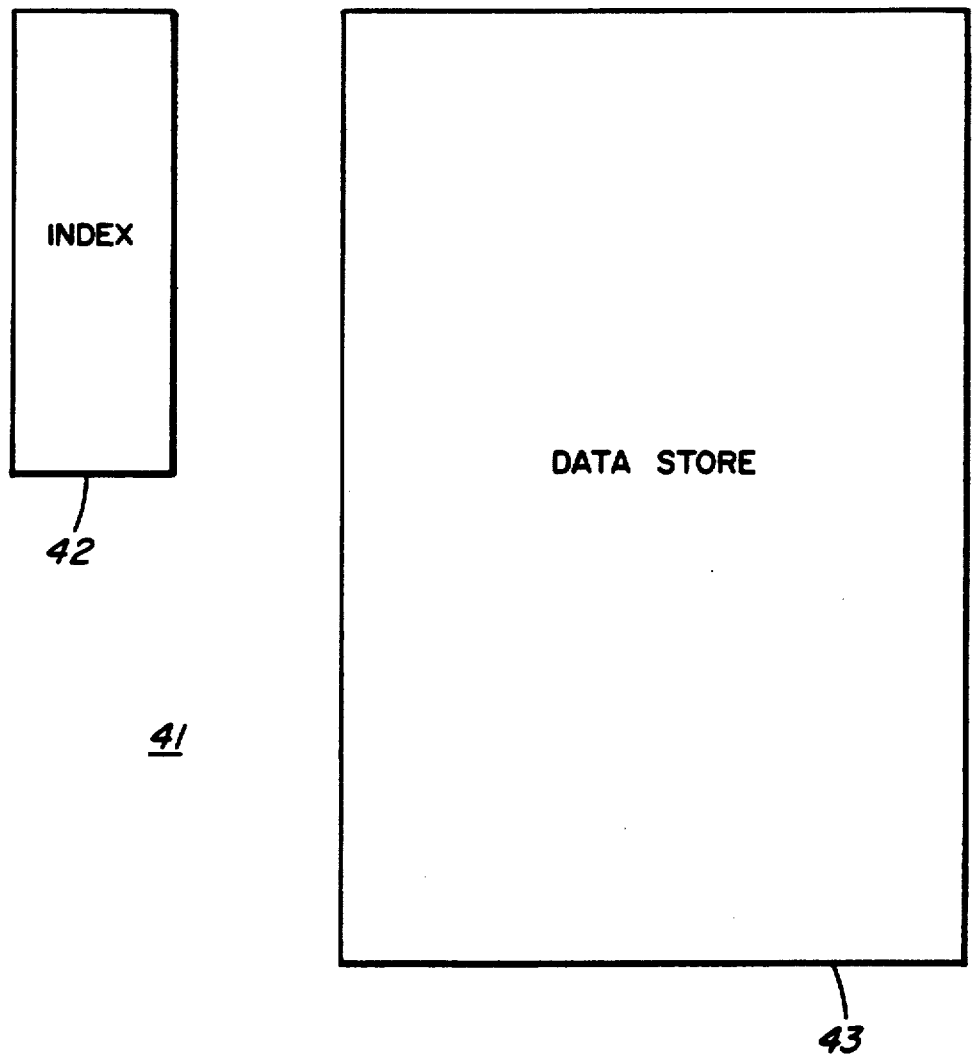
Figure 11:
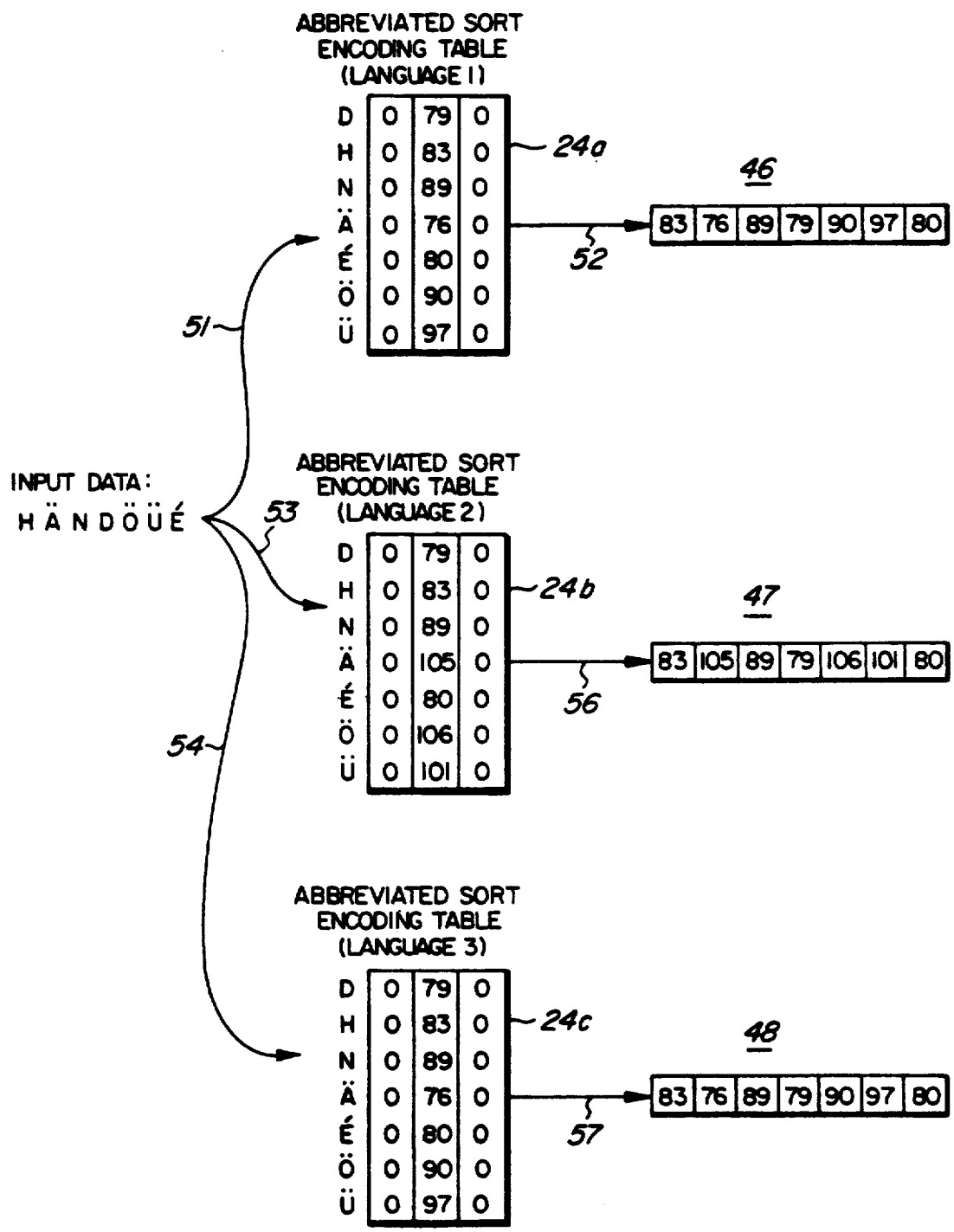
Figure 12:
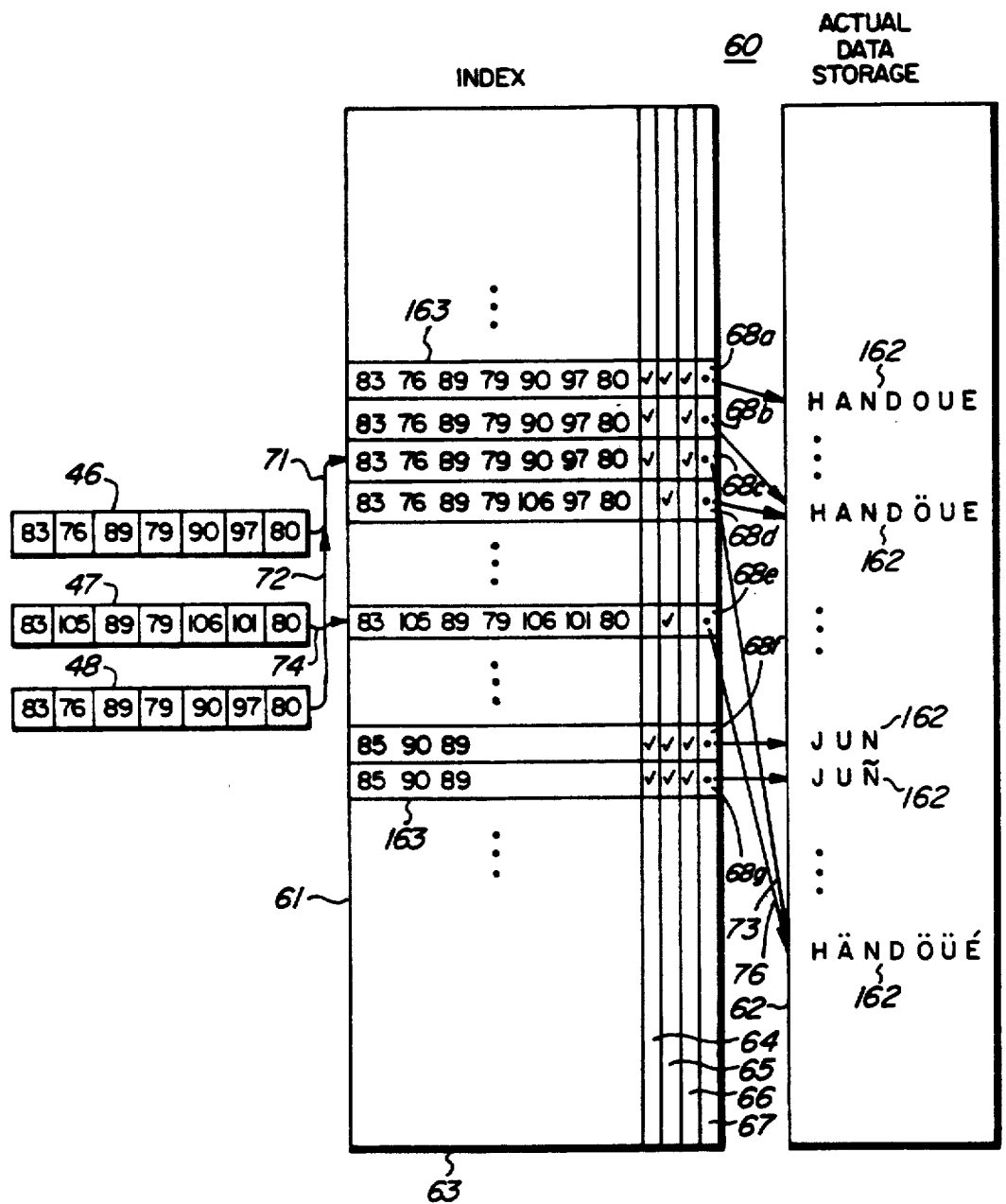
Figure 13:
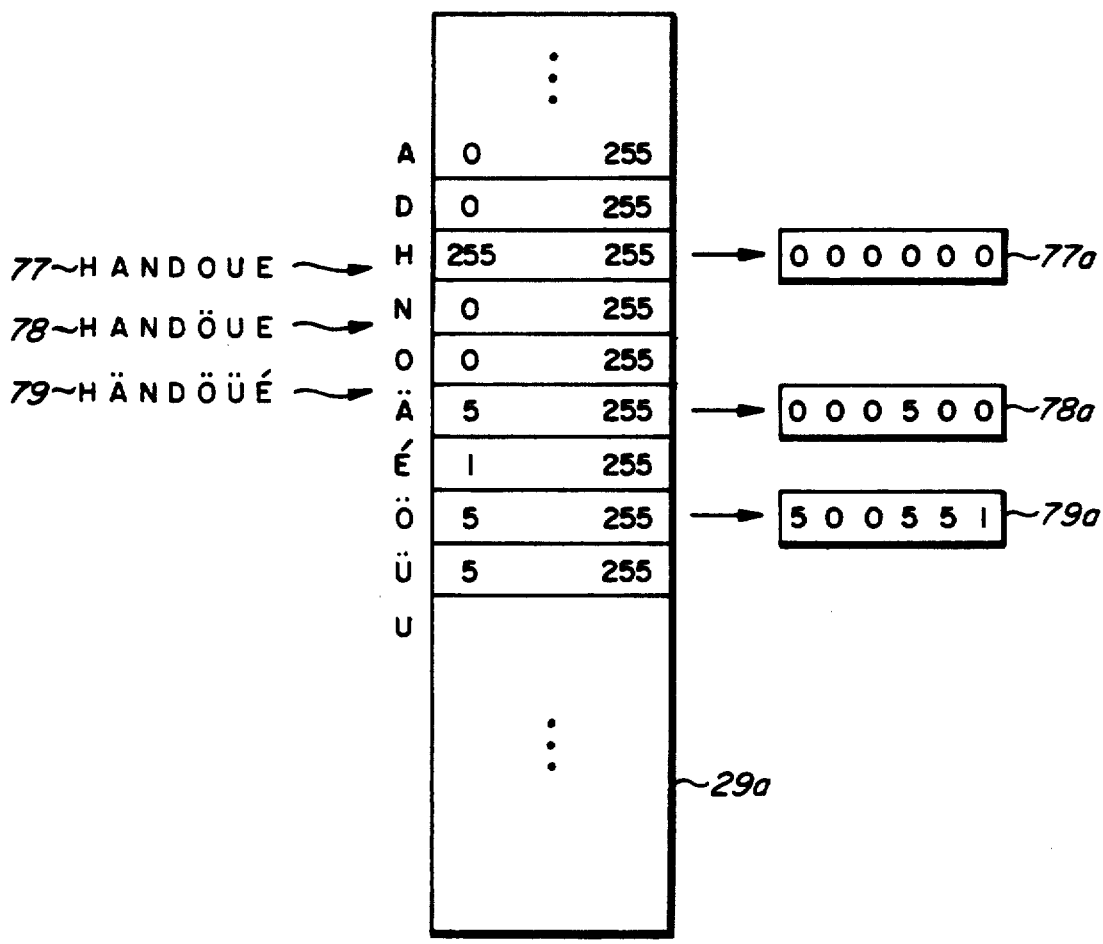
Figure 14:
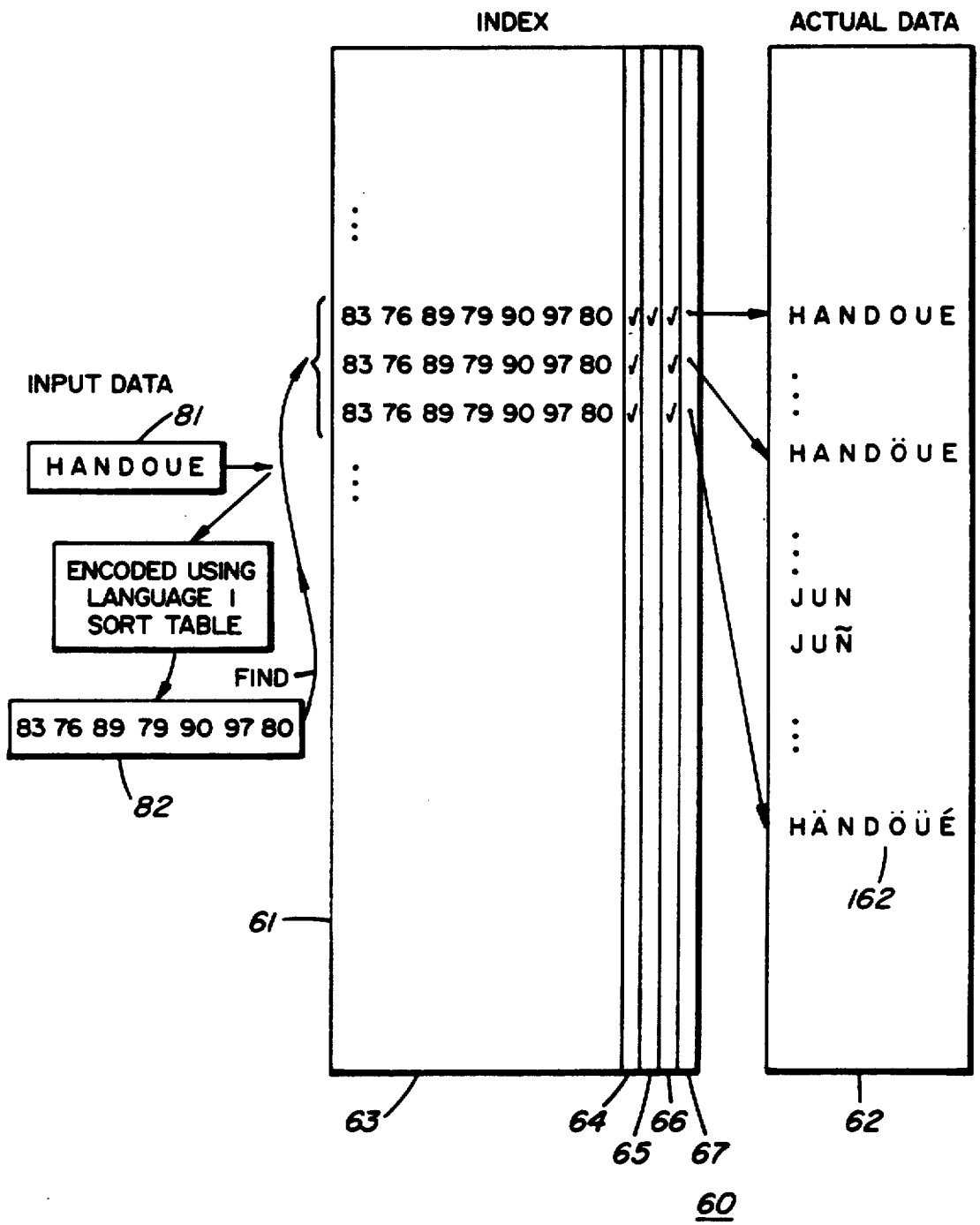
Figure 15:
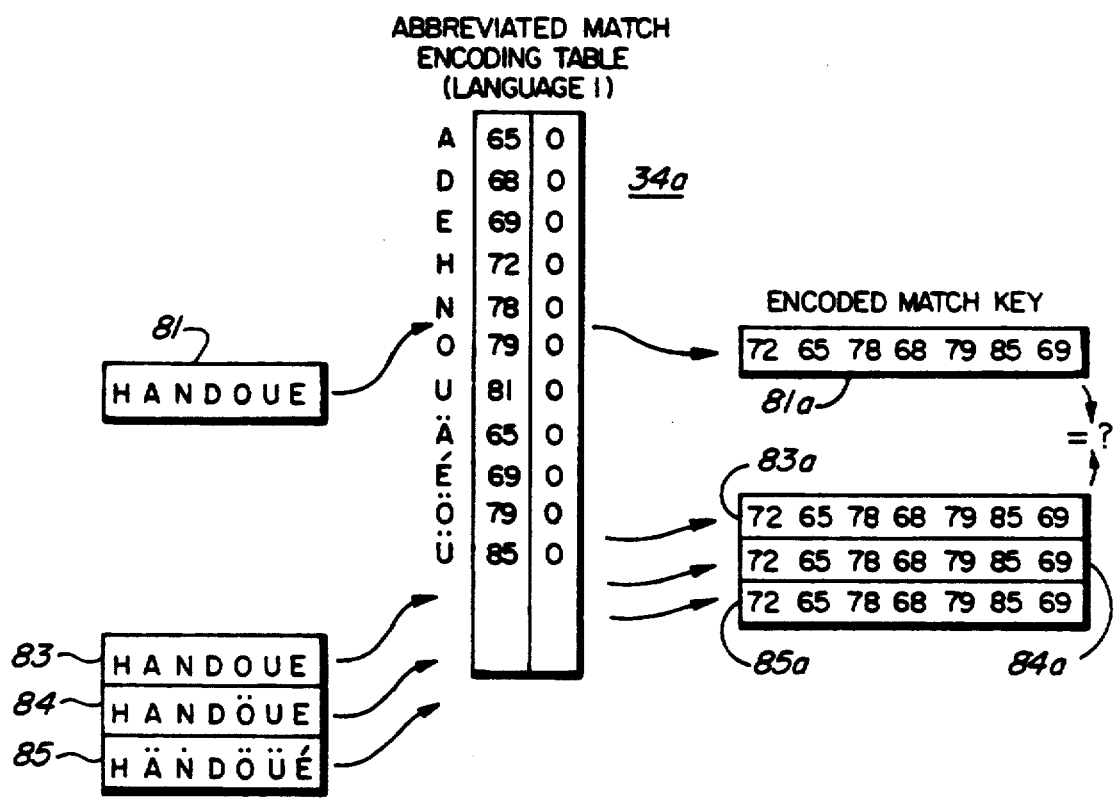

FIGS. 6, 7, and 8 are simplified flow charts useful for understanding the present invention;

FIG. 9 is a chart depicting Latin alphabet #1 of ISO 8859/1;

FIG. 10 is a simplified block diagram representation of a database;

FIG. 11 is a pictorial representation of an example illustrating the sort key encoding process of the present invention;

FIG. 12 is a pictorial representation of an example illustrating the insertion process of sort keys into a database;

FIG. 13 is a pictorial representation of the process of using the Accent Priority Encoding Table;

FIG. 14 is a pictorial representation of the retrieval process of the present invention;

FIG. 15 is a pictorial representation of the filtering process of the present invention;

Appendix A is a glossary of terms used in this document;

Appendix B is a listing of the Universal Sort Order sequence used in a preferred embodiment of the present invention;

Appendix C is a table showing the correspondence between the characters of some different languages;

Appendix D is a table showing the transliteration used in the present invention;

Appendix E is a sort encoding table for language 1;
Appendix F is a sort encoding table for language 2;
Appendix G is a sort encoding table for language 3;
Appendix H is a match encoding table for language 1;
Appendix I is a match encoding table for language 2;
Appendix J is a match encoding table for language 3;
Appendix K is an accent priority encoding table; and Appendix L is a simplified pseudocode listing useful for understanding the present invention.

DETAILED DESCRIPTION

FIG. 1A is a simplified block diagram representing sort encoding record 20. Record 20 has three fields: previous encoded sort order field 21; first encoded sort order field 22; and second encoded sort order field 23.

The first field of record 20, i.e. previous encoded sort order field 21, is used for the sorting of letter pairs encountered in two-to-two encoding. In these cases the preceding character (letter) has to be considered for sorting the current character. One instance where this arises is in the Spanish language where the character pair "CH" is sorted after the character pair "CZ". When encoding the sort order of the letter "H" (for Spanish) the process will first check to see whether or not the preceding letter was the character "C". The previous encoded sort order field 21 for the character "H", in this example, would be the sort encoded ordinal value for the character "C". If the "CH" pair is found then, instead of using the value in field 22, a very large ordinal number (greater than the ordinal for "Z") is assigned as the encoded sort ordinal for the letter "H". If unused, a special "don't care" value is stored in field 21.

The second field of record 20 is the first encoded sort order field 22. Field 22 is used for storing the first encoded sort ordinal value of an indexing input character.

The third field of record 20 is the second encoded sort order field 23. Field 23 is used for the case of one-to-two encoding as a second encoded sort ordinal value of an indexing input character. An example of its need would be when the character Æ is input (in language 1) and the encoded sort ordinal for the characters A and E are derived from fields 22 and 23 respectively. If unused, a special "don't care" value is stored in field 23.

FIG. 1B depicts one sort encoding table 24. One sort encoding table 24 is used for each supported language to define the particular sorting order for that language. In other words, if four languages were to be supported (e.g. English, Swedish, German, and French) then four tables 24 would be required. Note that appendices E, F, and G depict, in more detail, sort encoding tables for languages 1, 2 and 3 respectively.

Each table 24 consists of 256 sort encoding records 20, indexed by the ordinal values 25 of characters from the ISO 8859/1 alphabet (see FIG. 10). Each table 24 is used to create the sort key for that user's language by mapping each raw data character to one or two sort key characters.

FIG. 2A depicts accent priority encoding record 26. Record 26 consists of two fields: first encoded accent value field 27; and second encoded accent value field 28.

The first field of record 26, i.e. first encoded accent value field 27, is used to store the encoded accent value of a corresponding raw data character (i.e. a base character). For characters that could never have accents (e.g. "T", "X") a special "don't care" value (i.e. 255) is assigned. For base characters without any accent (e.g. "A", "E") the value will be "accentless" having the lowest sort accent order (i.e. 0). For accented characters (e.g. "Å", "É"), the accents are assigned values ordered from low to high as follows: acute, grave, circumflex, tilde, umlaut, ring, stroke (as in Ø), dash (as in Đ), cedilla, and finally the accent encoding for Icelandic THORN (þ).

The second field of record 26 is second encoded accent value field 28. Field 28 is used, in some cases, as a second encoded accent value used in conjunction with field 27; otherwise its value is "don't care" (i.e. 255). Field 28 is used for one-to-two encoding for characters such as "Æ" which are encoded with two sort orders. In this case, field 27 reflects the encoded accent value of the letter "A" whereas field 28 reflects the encoded accent value of the letter "E".

FIG. 2B depicts accent priority encoding table 29 consisting of 256 accent attribute encoding records 26, indexed by the ordinal values 30 of characters from the ISO 8859/1 alphabet (see FIG. 10). Table 29 is used to define the accent priority of the base characters when all the base characters of an input data string (keyword) are identical (except for possible accent differences). Note that the contents of table 29 are the same for all supported languages; in other words, there is only one table 29 and it supports all the languages under consideration. Appendix K depicts, in more detail, the contents of Accent Priority Encoding Table 29.

The records and the tables used for retrieval purposes will now be described. It should be noted that the retrieval process, in the preferred embodiment, is not merely the reverse of the insertion process. In the retrieval process, not only must sort keys be formed (as in the insertion process) but in addition, match keys must be formed. This is due to the fact that, in certain languages, different letters are sorted the same. For example, in language 2, the letters "V" and "W" have the same sort order; that is, the letters "V" and "W" are treated identically for sorting purposes. When one comes to retrieve data, it is desirable to distinguish between "V" and "W" to ensure that when one requests a word such as "wing" one only retrieves data indexed by the keyword "wing" and does not also retrieve data indexed by words such as "ving". This process is also referred to as filtering.

Figures 3A, 3B:
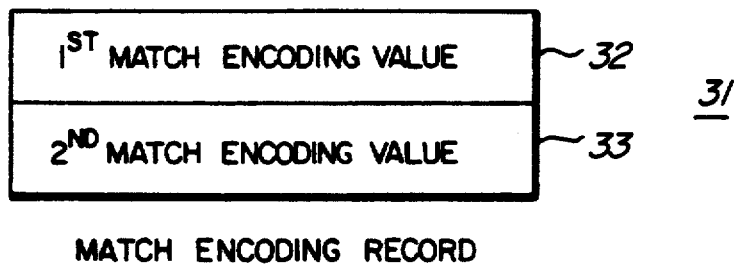
FIG. 3A is a simplified block diagram depicting the record structure of the present invention for the matching process.
FIG. 3B is a simplified block diagram depicting a match encoding table for the present invention.

FIG. 3A is a simplified block diagram representing match encoding record 31. Record 31 has two fields; first match encoding value field 32; and second match encoding value field 33.

The first field of record 31, i.e. first match encoding value field 32, is used to store the match encoding value for a character in the alphabet being used (e.g. ISO 8859/1).

The second field of record 31 is second match encoding value field 33. Field 33 is used to store the second match encoding value in cases where a single character maps to two ordinal values (i.e. one-to-two encoding; e.g. "Æ" maps to "A" and "E"). If not used, field 33 is assigned a special "don't care" value (e.g. 0).

FIG. 3B depicts one match encoding table 34. One match encoding table 34 is used for each supported language to define the particular match order for that language. In other words, if four languages were to be supported (e.g. English, Swedish, German, and French) then four tables 34 would be required. Note that Appendices H, I, and J depict, in more detail, match encoding tables for languages 1, 2, and 3 respectively.

Each table 34 consists of 256 match encoding records 31, indexed by the ordinal values 36 of characters from the ISO 8859/1 alphabet (see FIG. 10). Each table 34 is used to create the matchkey for that user's language by mapping each raw data character to one or two matchkey characters.

Before the invention is described in more detail, it should be noted that this invention addresses the sorting and searching of data base entries for a multilingual system. The scheme developed allows for the creation of a multilingual data retrieval system upon which efficient matching may be performed with entries being retrieved in sorted order. A prime application would be to person names in a directory, under conditions where speed of retrieval and the ability to handle names in several languages are major considerations.

The need for high performance in these applications dictates that sorting of the keys at run time is to be avoided. The scheme in this invention allows one to extract entries from a directory in sorted order without the necessity of a sorting operation at retrieval time.

Several major concepts in this invention are:

1) The entries in the data store will be stored exactly as entered, but there will be an index composed of keys derived from designated entry fields (e.g. person names) to facilitate retrieval. The index will be used for all insertion and retrieval purposes, and each index key will be associated with an entry in the data store. The characters composing the keys in this index will be from a character set that reflects the sorting order of the characters (Master or Universal Sort Order Sequence), not the multilingual character set (ISO 8859/1) of the entries. The Sequence establishes a unique sort order and eliminates any dependency on the character set's internal representation. The process of forming the keys from the raw data is known as "sort encoding".

2) For every entry in the data store an index key will be generated for each language supported at a site. In many cases identical keys will be produced in different languages, making it possible to combine index entries by indicating for which languages an index key is valid. An indication of the language a given key is valid for is stored in the index together with the key.

3) Retrieval will be performed by sort encoding (using the table for the user's language) the user entered search string and using it to extract corresponding entries from the key index. Only index entries valid for the user's language will be considered. Since sortwise equal entries are not always matchwise equal, matchkeys are also generated for each of the retrieved entries (using the match encoding table for the user's language), and compared against a matchkey generated from the user entered search string. All entries that match form the final retrieved set.

Let us begin a more detailed description of the invention by considering the situation regarding accents.

By studying the sorting orders of various languages, it can be observed that the majority of accented characters are sorted as being equal to the base unaccented character. Based on this observation, it is only necessary to have special positions in the sort order for characters that are not sorted as being equal to the corresponding unaccented characters.

Now let us look at the characters themselves. To give a better picture of the problems when multilingual character sets are supported, the sort orders of Language 1, Language 2, Language 3 and Language 4 are outlined below. Letters which have the same alphabetical order are enclosed in braces.

1) Language 1 Letters
A B C D E F G H I J K L M N O P Q R S T U V W X Y Z

2) Language 2 Letters
A B C D {E É} F G H I J K L M N O P Q R S T U {V W} X {Y Ü} Z Å Ä Ö

3) Language 3 Letters

{A Ä} B C D E F G H I J K L M N {O Ö} P Q R S β T {U Ü} V W X Y Z

4) Language 4 Letters

{A Á Å} B {C Ç} D {E É È Ê Ë} F G H {I Î Ï} J K L M N {O Ô} P Q R S T {U Ú Û Ü} V W X Y Z

In the Master Sort Order Sequence of the present invention, all sortwise equal characters are mapped to the base (unaccented) character. Accented characters that are sorted differently from the base character have their own unique positions in the set.

By composing such an ordered set of sort positions for all the languages that are supported by the multilingual character set (ISO 8859/1), a Master Sort Order Sequence obtained. The Sequence will also contain numerics and other non-alphabetic characters (such as brackets). Ordinal values are assigned to each character position in the Master Sort Order Sequence and each character in the multilingual character set maps to a designated ordinal value. The actual ordinal values are arbitrary, but the values assigned should increase in accordance with the character position in the sequence. For example, the characters "S", "β", "T" could have the values 94, 95, 96. An exemplary Master Sort Order Sequence for Language 1, Language 2, Language 3 and Language 4, is presented in Appendix B.

The mapping of the multilingual character set to the Master Sort Order Sequence will vary by language, depending on the characters contained in the alphabet for the language and their sort positions. For example, "Ä" will be for Language 2 will be mapped to a much larger value since "Ä" falls after "Z" in this case. The sort encoding schemes for the example languages 1 to 4 are presented in Appendix C. This encoding scheme is reflected in the actual sorting tables. The tables for the example languages 1 to 3 are shown in Appendices E, F, and G.

Matching Transliteration Scheme

As mentioned earlier, the matching process (a part of the retrieval process) uses the geometrical and phonetic transliteration rules to determine which user-entered characters should match which others. If a character is part of the alphabet for the language, then it can only be matched by entering the very same character.

The match transliteration schemes for Languages 1 to 4 are presented in Appendix D. From these schemes the Match Encoding tables for Languages 1 to 3 are derived and illustrated in Appendices H, I, and J. Note that the ISO 8859/1 character codes (ordinal values) are used in the tables. Therefore, if "Ê" is matched by "E", then the table entry for "Ê" will contain the ISO 8859/1 ordinal value for "E" (i.e. 69). Similarly for all accented "E"s. Characters that are only matched by themselves will contain their own (uppercase) ordinal values, and non-alphabetics are matched by themselves as well.

Construction of Sort keys and Matchkeys

The sort key encoding process (a part of both the insertion process and the retrieval process) consists of converting an input string into an encoded sort key. The translation is done using the Sorting Encoding Tables described in connection with FIG. 1B. Each character in the input string maps to one or two ordinal values depending on whether the encoding is "1-to-1" or "1-to-2". For "2-to-2 encoding" the previous encoded character has to be checked against the value stored in the table. The pseudocode and flowchart for the sort key encoding process (procedure Encode_Sort key) are presented in Appendix L and FIG. 7, respectively.

The matchkey encoding process (a part of the retrieval process) is similar to sort key encoding, except that the Match Encoding Tables (FIG. 3B) are used and only "1-to-1" and "1-to-2" encoding has to be considered. The pseudocode and flowchart for the matchkey encoding process (procedure Encode_MatchKey) are presented in Appendix L and FIG. 7, respectively.

The accent priority encoding process (a part of the insertion process) for accent priorities is similar to the matchkey encoding, except that the Accent Priority Encoding Tables (FIG. 2B) are used. The pseuocode and flowchart for the matchkey encoding process (procedure Encode_AccentKey) are presented in Appendix L and FIG. 8, respectively.

The insertion of new data into the database will now be described.

Figure 4:
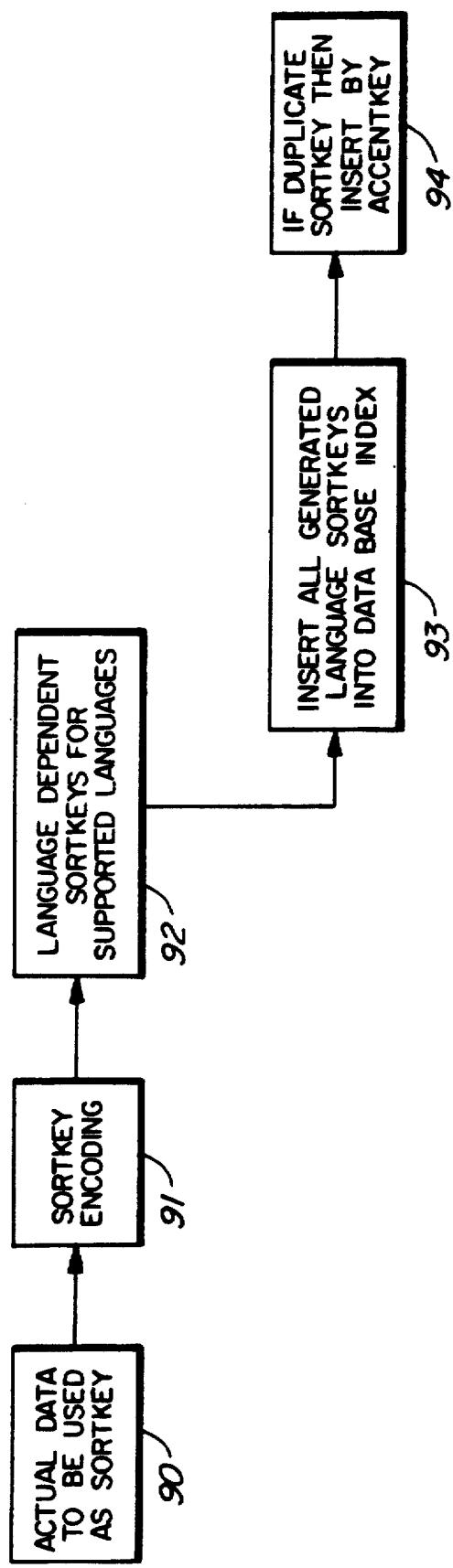
FIG. 4 is a simplified block diagram depicting the insertion processing steps for creation of the sort keys.

To insert a new entry into the data store, a designated field in the entry (say, a name field) is mapped onto the Master Sort Order Sequence to produce an index key for each language at the site (using the Sort Encoding Table, FIG. 1B). If necessary, the Accent Priority Encoding Table (FIG. 2B) is used in the insertion process as well. The process is depicted in FIG. 4. For example, the actual name
H Ä N D O Ü É
will be encoded as follows (note that key characters are from the Master Sort Order Sequence, Appendix B):

Language 1 key—H A N D O U E (all accented characters mapped onto unaccented)

Language 2 key—H A_umlaut_Lang2 N D O_umlaut_Lang2 Y E Notice that "É" is sorted same as "E"; "Ü" is sorted the same as "Y"; and "Ä", "Ö" have distinct sort positions)

Language 3 key—H A N D O U E (Notice that accented characters are sorted as corresponding unaccented ones).

The index keys derived are entered into the data base index. As an optimization, if an identical key is generated for two languages, the languages the key is valid for may be stored in a field stored with each index key. This cuts down on the number of duplicated index keys for the same entry, and consequently the search time.

In many languages there is a priority order for accented characters that comes into place only if two strings are absolutely identical, except for accents (e.g. "PAN", "PÄN", "PÅN"). It should be noted that this is a relatively rare occurrence, but the sorting rules of the present invention nevertheless cover this situation. The preferred embodiment supports a single accent priority ordering for all When insertion into the database reveals that the new index entry (sort key) is identical to an existing sort key (same sort key), the following process occurs:

1) All entries in the data store that have the same index entry (sort key) are extracted from the data store and passed through an accent encoding using the Accent Priority Encoding table (refer to FIG. 2B).

2) The encoded accent keys are used to determine the correct sort order of the new entry within the entries having the same index sort keys and the new entry is inserted in the appropriate location.

The above procedure requires that the data storage system support the ability to order entries having identical sort keys in a defined order (by accent priority) such that the entries will be retrieved in that order. This requirement is believed to be usually present in, or easy to add to, most data storage systems.

Retrieval of Entries

Figure 5:
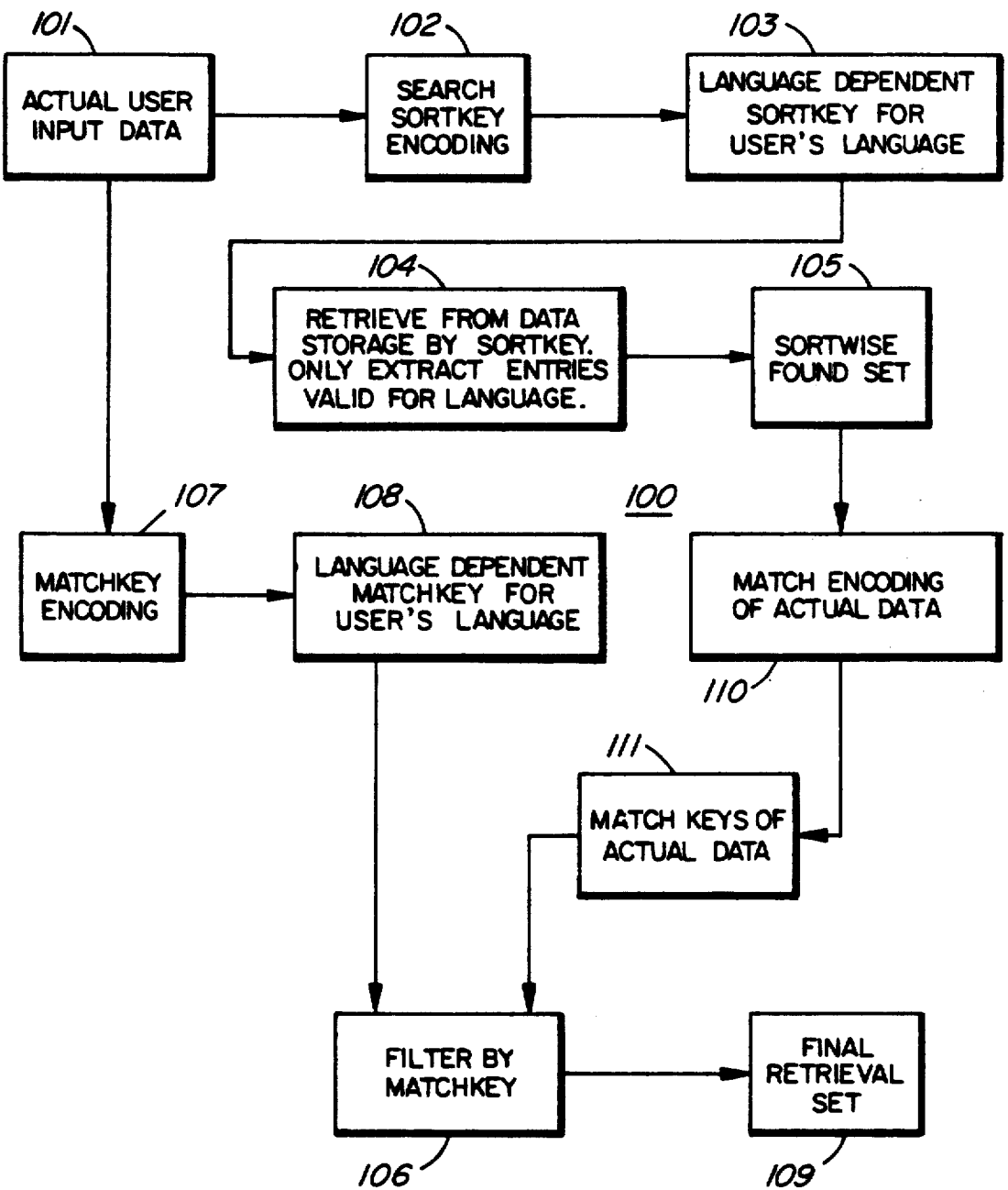
FIG. 5 is a simplified block diagram depicting the retrieval processing steps for matching and retrieving sort keys.

The following steps are required to perform a retrieval:

1) Obtain Sortwise Found Set for Language: The matching process consists of first extracting potential matches using the sort keys stored in the data base index. For this purpose, the user-entered search string is passed through an encoding to the Master Sort Order Sequence to map it to a sort key (using the Sort Encoding Table, FIG. 1B, corresponding to the user's language). Refer to FIG. 5. This process is similar to that used in constructing the index keys. Using this sort key, entries are then extracted from the data store to form the Sortwise Found Set. Any index keys not valid for the user's language are ignored.

2) Obtain Matchkey For User-Entered Match String: A matchkey is generated from the user-entered string using the Match Encoding Table for the user's language (refer to FIG. 5). For example, the actual entry in the database:
H Ä N D Ö Ü É
may be matched by entering the following:
Language 1—H A N D O U E
Language 2—H Ä N D Ö Ü É
Language 3—H Ä N D Ö Ü E 3) Filter Sortwise Found Set For Exact Match The entries in the Sortwise Found Set are passed through the match encoding (to the Match Order Sequence, similar to previous step using the Match Encoding Table) and compared to the user matchkey to determine true matches. Non-matches are discarded to yield the entries matched for the user's language. Refer to FIG. 5.

DETAILED EXAMPLE

A more detailed example of the operation of the invention will now be given. Let us begin by looking at a general case of a data base structure. FIG. 10 depicts, in simplified form, the general conceptualized structure of a database 41. Database 41 comprises an index 42 and a data store 43. For example, database 41 could be a telephone directory with index 42 containing the names of the individuals and businesses having telephone service in a given city. Data store 43 could then contain the names of those same individuals and companies along with their corresponding telephone numbers and addresses. In common practice, the entries in index 42 would be in alphabetical order (to simplify searching) and would include a "pointer" to the corresponding entries in data store 43. The entries in data store 43 are arranged in the order that they are entered into data store 43. For example, suppose that database 41 is a telephone directory (as stated earlier) and that a new customer named "Aaron" is to be included in database 41. The name "Aaron" will be entered into index 42 in alphabetical order. In this example the name "Aaron" will most likely be the first name in index 42 (in any event it will be very close to the beginning). The entry in data store 43, consisting of the name "Aaron" along with a corresponding telephone number and address will occur at the end of the existing contents in data store 43. In other words, the entries (data) in data store 43 are stored in the order in which they were entered into database 41. The entry in data store 43 is accessed by the "pointer" associated with the corresponding entry (i.e. "Aaron") in index 42.

In operation, if one wished to find, in database 41, the telephone number for a customer named "Aaron" one would search for its (i.e. the name "Aaron") occurrence in index 42. Because index 42 is in alphabetical order it can be searched relatively quickly. The entry (i.e. "Aaron") in index 42 points (via its associated "pointer") to the corresponding entry in data store 43, which is then accessed for the required information.

In short, it can be seen that this process is not unlike having a book with an index. The book itself is not in alphabetical order, but its index usually is.

The problem that arises in a multilingual situation is that an index that is in alphabetical order for a person who speaks one langauge may not be in the correct alphabetical order for a person who speaks a different language.

Let us return to our earlier example of the name H Ä N D Ö Ü É. Referring to FIG. 11 it can be seen that the present invention begins by creating three index sort keys 46, 47, and 48. FIG. 11 depicts three abbreviated sort encoding tables 24a, 24b, and 24c for languages 1, 2, and 3 respectively. Note that in addition to being abbreviated, tables 24a, 24b and 24c are depicted as being indexed by actual letters instead of the ordinal values of the characters (in order to keep the illustration of the invention simple).

As can be seen from FIG. 11, the name H Ä N D Ö Ü É is input data. This data is applied to table 24a as indicated graphically by line 51 (for language 1). The output of table 24a as indicated by line 52 is sort key 46. Note, that for this example, only the middle column of numbers (i.e. first encoded sort order) is used. Note also that sort key 46 is derived by the fact that the first letter of the input data (i.e. H) is mapped to the number "83" which is the first number of sort key 46. Likewise, the second letter of the input data (i.e. A) is mapped to the number "76" which is the second number of sort key 46. Similar steps are taken with the remainder of the input data to arrive at the rest of sort key 46.

Similar sort key encoding steps are taken for languages 2 and 3 using tables 24b and 24c as depicted by lines 53 and 54 respectively. The output of the encoding step from table 24b, as indicated by line 56, is sort key 47. Similarly, the output of the encoding step from table 24c, as indicated by line 57, is sort key 48.

FIG. 12 depicts schematically, in simplified form, how the sort keys 46, 47, and 48 (from FIG. 11) are inserted into database 60 comprised of index 61 and data store 62.

First, note that index 61 has five columns, or fields 63, 64, 65, 66 and 67. The first field is index sort key field 63 which contains the sort keys such as 46, 47, etc. The example of FIG. 12 is for three languages, and the next three fields are first language field 64, second language field 65, and third language field 66. The last field is pointer field 67.

Index 61 is set up such that for each entry 68 in index 61, field 63 contains a sort key; fields 64, 65, and 66 contain an indication of which language the corresponding sort key relates to (also referred to as a language bit map); and field 67 contains a pointer to indicate the address of the corresponding entry in data store 62.

Looking now at sort keys 46, 47, and 48, it can be seen that sort key 46 is identical to sort key 48. Consequently, as indicated by lines 71 and 72, sort keys 46 and 47 are combined and entered as a common entry 68c in index 63 with an indicator being set in fields 64 and 66 (corresponding to languages 1 and 3 for which sort keys 46 and 48 are applicable). The corresponding field 67 contains a pointer (a number) indicating the location of the corresponding entry in data store 62. To keep this example from becoming unwieldy, the pointer is indicated as a line 73 pointing to the entry H Ä N D Ö Ü É in data store 62.

Note that entry 68c is placed in index 63 in numerical order of sort key; as a result, entry 68c is placed immediately following entry 68b (which just happens to have the same values as entry 68c) and before entry 68d which has a higher numerical value in its fifth position (i.e. the value "106" vs "90").

Sort key 47 is also placed in index 61 according to its numerical value as indicated by line 74. Sort key 47 becomes entry 68e in this example. Entry 68e has an indicator set in field 65 (and not set in fields 64 and 66) 30 to indicate that entry 68e applies only to language 2. The pointer in pointer field 67 points to the corresponding entry in data store 62 as indicated by line 76 (which is the same data that entry 68c points to).

Note that when entry 68c is made, it can be seen that there were already two sort keys that were identical to the sort key of entry 68c, namely the sort keys of entries 68a and 68b. Because of this, the actual data (in data store 62) referenced by entries 68a and 68b is retrieved and encoded using the Accent Priority Encoding Table (see FIG. 2B and Appendix K). In addition, the data relating to entry 68c is also retrieved and encoded using the accent priority encoding table (Appendix K).

FIG. 13 depicts the process of using Accent Priority Encoding Table 29a which is an abbreviated version Appendix K. Note that in order not to unduly complicate this example, table 29a is indexed by the actual letters used in the example, and not by the ordinal value of the characters as is done in FIG. 2B and Appendix K.

The data corresponding to entries 68a, 68b, and 68c (of FIG. 12) are indicated as data 77, data 78, and data 79 respectively in FIG. 13. After being encoded by table 29a the data comes out as encoded data 77a, encoded data 78a, and encoded data 79a, respectively. The numerical order of encoded data 77a, 78a, and 79a defines the order in which entries 68a, 68b, and 68c will be arranged. In short, entries 68a, 68b, and 68c are arranged in the same order as are the corresponding encoded data 77a, 78a, and 79a. In the example given here, this means that the order depicted in FIG. 12, for entries 68a, 68b, and 68c is the correct order.

FIG. 14, illustrating the retrieval of data from database 60, will now be d. For this example we assume that a language 1 user enters, as input data 81, the word "H A N D O U E". Input data 81 is encoded using language 1 sort encoding table (see FIG. 1B and Appendix E) to arrive at seach sort key 82.

Sort key 82 is then used to search index 61 of database 60. As depicted in FIG. 14, only the matches in index 61 are shown; and as depicted in FIG. 14 there are three matches. As indicated by the pointers of index 61 there are three different data entries in data store 62 that could match; these are the entries "H A N D O U E", "H A N D O U E" and "H Ä N D Ö U E".

FIG. 15 illustrates the filtering process that takes place to ensure that only the appropriate data in data store 62 is accessed. Input data 81 is applied to match encoding table 34a which is an abbreviated version of table 34 of FIG. 3B and Appendix H for language 1.

Note that table 34a is indexed by the actual letters used in this example, rather than by the ordinal value of the characters (in order not to unduly complicate the example). The output from table 34a (for the input of data 81) is encoded match key 81a.

Additionally, all the actual data in the found set (i.e. "H A N D O U E", "H A N D Ö U E" and "H Ä N D Ö Ü (e,acu/E/ " in this example) from FIG. 14 are encoded using table 34a. This is illustrated in FIG. 15 by found data 83, 84, and 85. When data 83, 84 and 85 is applied to table 34a the results are the encoded match keys 83a, 84a, and 85a respectively, as shown in FIG. 15.

The encoded match keys 83a, 84a, and 85a are compared against encoded match key 81a. If they are the same then the found data corresponding to that encoded match key 83a, 84a, 85a that was the same is displayed to the user. In this case, all found data 83, 84, and 85 will be selected and displayed to the user since their corresponding encoded match keys 83a, 84a, and 85a each matched (were identical to) the encoded match key 81a for input data 81.

Note that while in the foregoing example all the found data was accepted, this was due to the fact that this example was done for a language 1 user. If the user used a language in which he could enter "H A N D Ö Ü É" as input data 81, then the filtering process would eliminate found data 83 and 84 during the filtering step and the final answer would be found data 85.

Let's now return to FIGS. 4 to 8 for more detail now that we have worked our way through an example.

FIG. 4 is a simplified block diagram depicting the insertion processing steps for creating and inserting sort keys 163 into index 61 (FIG. 12). Block 90 indicates the actual data that is to be encoded to become a sort key 163 (e.g. the name "H Ä N D Ö Ü É"). That data is then applied to encoding block 91 where the actual sort key encoding takes place using the sort encoding table 24 of FIG. 1B (one table 24 for each language supported).

The result of the encoding in block 91 is a set of language dependent sort keys 163 (one for each language supported) as depicted in block 92. The next step, as represented by entry block 93, is to insert all the generated sort keys into the database index 61 (and of course the corresponding data entries into the database data store 62). Block 94 represents the ordering by accent if any sort keys are identical to any other sort keys. The step of block 94 makes use of accent priority encoding table 29 (FIG. 2B; see also Appendix K).

FIG. 5 is a simplified block diagram depicting the retrieval processing steps 100 for matching and retrieving sort keys from a database index. We start with block 101 which represents the actual data 81 (FIG. 14) input by a user (i.e. the data which the user wishes to locate in the database 60). From block 101 we move in two directions. The first direction involves moving to encoding block 102 where the sort key 82 (FIG. 14) for the input data is encoded making use of one sort encoding table 24 (the table 24 which supports the user's language). The result of the encoding of block 102 is the single sort key 82 of block 103. The next block is retrieval block 104. Block 104 illustrates the step of locating in database index 61 the stored sort keys 163 that are the same as the just encoded sort key 82; only sort keys 163 in database 60 that are valid for the user's language are selected using the language bit map (fields 64, 65, and 66 in FIG. 12). The actual data store 62 entries (FIG. 12) corresponding to the selected sort keys 163 are retrieved to form the sortwise found set of block 105 (FIG. 5).

Block 105 illustrates the sortwise found set (i.e. a set of actual data entries 162) which is the result of the block 104 retrieval step. At this stage of the retrieval process 100 we now have found all the sort keys in database index 61 that could possibly be of interest, but due to the nature of the encoding process we may have too many. Block 110 illustrates that the actual data in the sortwise found set of block 105 (corresponding to the sort keys 163) is encoded making use of one match encoding table 34 (the table 34 which supports the user's own language). The result of this match encoding is the corresponding match keys of block 111. We may still have too many selections (note that block 111 has the same number of entries as does block 105), consequently we require the filtering step performed by filter block 106.

Before we can describe the operation of filter block 106 we must return to block 101 with the input data, and take the second direction therefrom. The second direction involves moving to encoding block 107. Encoding block 107 illustrates encoding the input data of block 101 making use of one match encoding table 34 (the table 34 which supports the user's language; the same one used in block 110). The result of the encoding of block 107 is the single match key of block 108.

The contents of blocks 111 and 108 are then applied to filtering block 106 where the match key from block 108 is compared to all the match keys from block 111. If a match key from block 111 is identical to the match key from block 108, then the actual data entry 162 (FIG. 12) corresponding to that match key is entered in block 109 as part (or all) of the final retrieval set.

FIG. 6 is a flow chart depicting in more detail the sort key encoding process 116. Process 116 begins with block 117. The next step is block 118 in which the input data characters are read in from the data input string. Next comes the decision process of decision block 119 wherein it is decided whether or not the encoding requires 2-to-2 conversion. If the answer is yes, then block 120 is accessed and the conversion occurs as part of the encoding process using the sorting encoding tables (see FIG. 1B and Appendices E, F, & G).

If the answer for decision block 119 is no, then decision block 121 is accessed wherein it is decided whether or not the encoding requires 1-to-2 conversion. If the answer to block 121 is yes, then block 122 is accessed and the conversion occurs as part of the encoding process using the sorting encoding tables (see FIG. 1B and Appendices E, F, and G).

If the answer for decision block 121 is no, then the conversion must be 1-to-1 (by default) and block 123 is accessed and the conversion occurs as part of the encoding process using the sorting encoding tables (see FIG. 1B and Appendices E, F, and G).

Finally, decision block 124 is accessed. This block determines whether or not the entire data input string has been encoded. If the answer is no, then the process returns to block 118 to read in another character. If the entire data input string has been encoded, then end block 125 is accessed, and sort key encoding process 116 is complete.

FIG. 7 is a flow chart depicting in more detail the match key encoding process 126. Process 126 begins with block 127. The next step is block 128 in which the input data characters are read in from the data input string. Next comes the decision process of decision block 129 wherein it is decided whether or not the encoding requires 1-to-2 conversion. If the answer is yes, then block 130 is accessed and the conversion occurs as part of the encoding process using the match encoding tables (see FIG. 3B and Appendices H, I, and J).

If the answer for decision block 129 is no, then the conversion must be 1-to-1 (by default) and block 131 is accessed and the conversion occurs as part of the encoding process using the match encoding tables (see FIG. 3B and Appendices H, I, and J).

Finally, decision block 132 is accessed. This block determines whether or not the entire data input string has been encoded. If the answer is no, then the process returns to block 128 to read in another character. If the entire data input string has been encoded, then end block 133 is accessed, and match key encoding process 126 is complete.

FIG. 8 is a flow chart depicting in more detail the accent priority encoding process 136. Process 136 begins with block 137. The next step is block 138 in which the input data characters are read in from the data input string. Next comes the decision process of decision block 139 wherein it is decided whether or not the encoding requires 1-to-2 conversion. If the answer is yes, then block 140 is accessed and the conversion occurs as part of the encoding process using the accent priority encoding table (see FIG. 2B and Appendix K).

If the answer for decision block 139 is no, then the conversion must be 1-to-1 (by default) and block 141 is accessed and the conversion occurs as part of the encoding process using the accent priority encoding table (see FIG. 2B and Appendix K).

Finally, decision block 142 is accessed. This block determines whether or not the entire data input string has been encoded. If the answer is no, then the process returns to block 138 to read in another character. If the entire data input string has been encoded, then end block 143 is accessed, and accent priority encoding process 136 is complete.

APPENDIX A

Glossary

| Term | Definition |
| --- | --- |
| Sorting | The word "Sorting" used in this document in general refers primarily to the alphabetical ordering of letters. The mechanism addresses collating order of digits, letters and non-alphanumerical characters, transliteration of foreign letters and character priority. |
| Sort Encoding | An encoding scheme which is aimed primarily to deal with "Sorting". The operation is to encode the words to a standard form that forms the basis for ordering the entries in a data store. |
| Matching | The word "Matching" used in this paper in general refers primarily to the process of entering a string of characters to retrieve a corresponding entry in some data base that contains a similar string in it. |
| Match Encoding | An encoding scheme which is aimed primarily to deal with "Matching". The operation is used to encode the words to a standard form that may be compared with other entries passed through the same encoding to determine if they are identical. |
| 1-to-1 Encoding | The normal mapping of a single input character to a single encoded ordinal value for purposes of sort or match encoding. For example, the character "S" |

APPENDIX A

Glossary

| | |
|---|---|
| | will map to a single ordinal value. |
| 1-to-2 Encoding | The mapping of a single input character to two encoded ordinal values for purposes of sort or match encoding. For example, the character "Æ" may map to the ordinal values associated with the character pair "AE". |
| 2-to-2 Encoding | The mapping of two input characters to two encoded ordinal values for purposes of sort encoding. For example, in Spanish, the pair of characters "CH" sorts between "CZ" and "D". This pair of characters will be mapped to two ordinal values to reflect this fact. |
| Foreign Letters | Letters that are not included in one's language. |
| Accent Priority | Priority is assigned to accent when the words being compared differ only by accent. |
| Alphabet | The letters used in one's language. |
| Sort Order | The collating sequence of characters. |
| Transliteration | The operation of representing the characters (letters or signs) of one alphabet by those of another, in principle letter by letter. The concept behind the transliteration process used in this invention is very simple: characters that do not appear in a language are collated where users of that language might be expected to look for them and in most cases the grouping is based on geometrical similarity and sometimes by means of phonetic similarity. |
| Character Set | The ordered values assigned to characters as defined in a standard (e.g. ISO 8859/1). Denotes which ordinal values are associated with which characters. |
| Multilingual Data | Data containing letters from more than a single language. |

APPENDIX B: Master Sort Order Sequence

The master (or universal) sort order sequence defined here is for the four languages (Language 1, Language 2, Language 3 and Language 4 which may be English, Swedish, German, and French respectively) which are used as examples throughout this invention. The numbers on the left-hand-side are the sort orders and the characters are on the right-hand-side.

Symbols and Punctuations

| | |
|---|---|
| 0 dontcare | |
| 1 blank, no break space | 34 inverted exclamation mark |
| 2 exclamation mark | 35 cent sign |
| 3 double quote | 36 pound sign |
| 4 number sign | 37 currency sign |
| 5 dollar sign | 38 yen sign |
| 6 percen sign | 39 broken bar |
| 7 ampersand | 40 paragaph sign |
| 8 apostrophe | 41 diaeresis |
| 9 left parenthesis | 42 copyright sign |
| 10 right parenthesis | 43 feminine ordinal indicator |
| 11 asterisk | 44 left angle quotation mark |
| 12 plus sign | 45 not sign |
| 13 comma | 46 registered trademark sign |
| 14 hyphen, sylabic hyphen | 47 macron |
| 15 full stop | 48 degree sign |
| 16 slash | 49 plus minus sign |
| 17 colon | 50 superscript two |
| 18 semi colon | 51 superscript three |
| 19 less than sign | 52 acute accent |
| 20 equals sign | 53 micro sign |
| 21 greater than sign | 54 pilcrow sign |
| 22 question mark | 55 middle dot |
| 23 at sign | 56 cedilla |
| 24 left square bracket | 57 superscript one |
| 25 back slash | 58 masculine ordinal indicator |
| 26 right square bracket | 59 right angle quotation mark |
| 27 circumflex accent | 60 one quarter |
| 28 underscore | 61 one half |
| 29 grave accent | 62 three quarters |
| 30 left curly bracket | 63 inverted question mark |
| 31 vertical bar | 64 multiplication sign |
| 32 right curly bracket | 65 division sign |
| 33 tilde | |

Digits and Letters

| | |
|---|---|
| 66 digit 0 | 76 A |
| 67 digit 1 | 77 B |
| 68 digit 2 | 78 C |
| 69 digit 3 | 79 D |
| 70 digit 4 | 80 E |
| 71 digit 5 | 81 F |
| 72 digit 6 | 82 G |
| 73 digit 7 | 83 H |
| 74 digit 8 | 84 I |
| 75 digit 9 | 85 J |
| | 86 K |
| | 87 L |
| | 88 M |
| | 89 N |
| | 90 O |
| | 91 P |
| | 92 Q |
| | 93 R |
| | 94 S |
| | 95 Sharp_S_Lang3 |
| | 96 T |
| | 97 U |
| | 98 V |
| | 99 W |
| | 100 X |
| | 101 Y |
| | 102 Z |
| | 103 A_ring_Lang2 |
| | 104 A_umlaut_Lang2 |
| | 105 O_umlaut_Lang2 |

Accents 0 characters that do not have accents (eg. A, C, E)
1 acute accent
2 grave accent
3 circumflex accent
4 tilde accent
5 umlaut accent
6 ring accent
7 stroke accent
8 dash
9 cedilla
10 other accents
255 accentless characters/dontcare (eg. B, X, Z)

APPENDIX C: Encoding Scheme for Sort Order

The sort orders associated with the characters under each language come from the Master Sort Order Sequence (Appendix B). For Example, the sort order for "A" is 76 for Languages 1, 2, 3 and 4 whereas that for "Ä" is 76 for Languages 1, 3 and 4 and 104 (A_umlaut_Lang2) for Language 2.

| Latin Character | Language 1 Equivalent | Language 2 Equivalent | Language 3 Equivalent | Language 4 Equivalent |
|---|---|---|---|---|
| A | A | A | A | A |
| B | B | B | B | B |
| C | C | C | C | C |
| D | D | D | D | D |
| E | E | E | E | E |
| F | F | F | F | F |

APPENDIX C: Encoding Scheme for Sort Order

The sort orders associated with the characters under each language come from the Master Sort Order Sequence (Appendix B). For Example, the sort order for "A" is 76 for Languages 1, 2, 3 and 4 whereas that for "Ä" is 76 for Languages 1, 3 and 4 and 104 (A_umlaut_Lang2) for Language 2.

| Latin Character | Language 1 Equivalent | Language 2 Equivalent | Language 3 Equivalent | Language 4 Equivalent |
|---|---|---|---|---|
| G | G | G | G | G |
| H | H | H | H | H |
| I | I | I | I | I |
| J | J | J | J | J |
| K | K | K | K | K |
| L | L | L | L | L |
| M | M | M | M | M |
| N | N | N | N | N |
| O | O | O | O | O |
| P | P | P | P | P |
| Q | Q | Q | Q | Q |
| R | R | R | R | R |
| S | S | S | S | S |
| T | T | T | T | T |
| U | U | U | U | U |
| V | V | V | V | V |
| W | W | W | W | W |
| X | X | X | X | X |
| Y | Y | Y | Y | Y |
| Z | Z | Z | Z | Z |
| À | A | A | A | À |
| Á | A | A | A | Á |
| Â | A | A | A | Â |
| Ã | A | A | A | Ã |
| Ä | A | A_umlaut_Lang2 | A | Ä |
| Å | A | A_ring_Lang2 | A | Å |
| Æ | AE | A_umlaut_Lang2 | AE | AE |
| Ç | C | C | C | C |
| È | E | E | E | È |
| É | E | E | E | É |
| Ê | E | E | E | Ê |
| Ë | E | E | E | Ë |
| Ì | I | I | I | I |
| Í | I | I | I | Í |
| Î | I | I | I | Î |
| Ï | I | I | I | Ï |
| Ð | D | D | D | D |
| Ñ | N | N | N | N |
| Ò | O | O | O | O |
| Ó | O | O | O | Ó |
| Ô | O | O | O | Ô |
| Õ | O | O | O | Õ |
| Ö | O | O_umlaut_Lang2 | O | Ö |
| Ø | O | O_umlaut_Lang2 | O | O |
| Ù | U | U | U | Ù |
| Ú | U | U | U | Ú |
| Û | U | U | U | Û |
| Ü | U | Y | U | Ü |
| Ý | Y | Y | Y | Y |
| Þ | P | P | P | P |
| ß | ss | ss | Sharp_S_Lang3 | ss |
| ÿ | Y | Y | Y | Y |

APPENDIX D: TRANSLITERATION SCHEME FOR MATCHING

| Matched Character(s) | Character Input by a Language 1 User | Character Input by a Language 2 User | Character Input by a Language 3 User | Character Input by a Language 4 User |
|---|---|---|---|---|
| A | A | A | A | A |
| B | B | B | B | B |
| C | C | C | C | C |
| D | D | D | D | D |
| E | E | E | E | E |
| F | F | F | F | F |
| G | G | G | G | G |
| H | H | H | H | H |
| I | I | I | I | I |
| J | J | J | J | J |
| K | K | K | K | K |
| L | L | L | L | L |
| M | M | M | M | M |
| N | N | N | N | N |
| O | O | O | O | O |
| P | P | P | P | P |
| Q | Q | Q | Q | Q |
| R | R | R | R | R |
| S | S | S | S | S |
| T | T | T | T | T |
| U | U | U | U | U |
| V | V | V | V | V |
| W | W | W | W | W |
| X | X | X | X | X |
| Y | Y | Y | Y | Y |
| Z | Z | Z | Z | Z |
| À | A | A | A | À |
| Á | A | A | A | Á |
| Â | A | A | A | Â |
| Ã | A | A | A | Ã |
| Ä | A | Ä | A | Ä |
| Å | A | Å | A | Å |
| Æ | AE | Ä | AE | AE |
| Ç | C | C | C | Ç |
| È | E | E | E | È |
| É | E | É | E | É |
| Ê | E | E | E | Ê |
| Ë | E | E | E | Ë |
| Ì | I | I | I | I |
| Í | I | I | I | Í |
| Î | I | I | I | Î |
| Ï | I | I | I | Ï |
| Ð | D | D | D | D |
| Ñ | N | N | N | N |
| Ò | O | O | O | O |
| Ó | O | O | O | Ó |
| Ô | O | O | O | Ô |
| Õ | O | O | O | O |
| Ö | O | Ö | O | Ö |
| Ø | O | Ö | O | O |
| Ù | U | U | U | Ù |
| Ú | U | U | U | Ú |
| Û | U | U | U | Û |
| Ü | U | Ü | U | Ü |
| Ý | Y | Y | Y | Y |
| Þ | P | P | P | P |
| ß | ss | ss | ß | ss |
| ÿ | Y | Y | Y | Y |

APPENDIX E: SORT ENCODING TABLE (LANGUAGE 1)

| | | | |
|---|---|---|---|
| 0 | 0 | 0 | 0 |
| 1 | 0 | 0 | 0 |
| 2 | 0 | 0 | 0 |
| 3 | 0 | 0 | 0 |
| 4 | 0 | 0 | 0 |
| 5 | 0 | 0 | 0 |
| 6 | 0 | 0 | 0 |
| 7 | 0 | 0 | 0 |
| 8 | 0 | 0 | 0 |
| 9 | 0 | 0 | 0 |
| 10 | 0 | 0 | 0 |
| 11 | 0 | 0 | 0 |
| 12 | 0 | 0 | 0 |
| 13 | 0 | 0 | 0 |
| 14 | 0 | 0 | 0 |
| 15 | 0 | 0 | 0 |
| 16 | 0 | 0 | 0 |
| 17 | 0 | 0 | 0 |
| 18 | 0 | 0 | 0 |

APPENDIX E: SORT ENCODING TABLE (LANGUAGE 1)

| | | | | | | | |
|---|---|---|---|---|---|---|---|
| 19 | 0 | 0 | 0 | | 100 | 0 | 79 | 0 |
| 20 | 0 | 0 | 0 | | 101 | 0 | 80 | 0 |
| 21 | 0 | 0 | 0 | | 102 | 0 | 81 | 0 |
| 22 | 0 | 0 | 0 | | 103 | 0 | 82 | 0 |
| 23 | 0 | 0 | 0 | | 104 | 0 | 83 | 0 |
| 24 | 0 | 0 | 0 | | 105 | 0 | 84 | 0 |
| 25 | 0 | 0 | 0 | | 106 | 0 | 85 | 0 |
| 26 | 0 | 0 | 0 | | 107 | 0 | 86 | 0 |
| 27 | 0 | 0 | 0 | | 108 | 0 | 87 | 0 |
| 28 | 0 | 0 | 0 | | 109 | 0 | 88 | 0 |
| 29 | 0 | 0 | 0 | | 110 | 0 | 89 | 0 |
| 30 | 0 | 0 | 0 | | 111 | 0 | 90 | 0 |
| 31 | 0 | 0 | 0 | | 112 | 0 | 91 | 0 |
| 32 | 0 | 1 | 0 | | 113 | 0 | 92 | 0 |
| 33 | 0 | 2 | 0 | | 114 | 0 | 93 | 0 |
| 34 | 0 | 3 | 0 | | 115 | 0 | 94 | 0 |
| 35 | 0 | 4 | 0 | | 116 | 0 | 96 | 0 |
| 36 | 0 | 5 | 0 | | 117 | 0 | 97 | 0 |
| 37 | 0 | 6 | 0 | | 118 | 0 | 98 | 0 |
| 38 | 0 | 7 | 0 | | 119 | 0 | 99 | 0 |
| 39 | 0 | 8 | 0 | | 120 | 0 | 100 | 0 |
| 40 | 0 | 9 | 0 | | 121 | 0 | 101 | 0 |
| 41 | 0 | 10 | 0 | | 122 | 0 | 102 | 0 |
| 42 | 0 | 11 | 0 | | 123 | 0 | 30 | 0 |
| 43 | 0 | 12 | 0 | | 124 | 0 | 31 | 0 |
| 44 | 0 | 13 | 0 | | 125 | 0 | 32 | 0 |
| 45 | 0 | 14 | 0 | | 126 | 0 | 33 | 0 |
| 46 | 0 | 15 | 0 | | 127 | 0 | 0 | 0 |
| 47 | 0 | 16 | 0 | | 128 | 0 | 0 | 0 |
| 48 | 0 | 66 | 0 | | 129 | 0 | 0 | 0 |
| 49 | 0 | 67 | 0 | | 130 | 0 | 0 | 0 |
| 50 | 0 | 68 | 0 | | 131 | 0 | 0 | 0 |
| 51 | 0 | 69 | 0 | | 132 | 0 | 0 | 0 |
| 52 | 0 | 70 | 0 | | 133 | 0 | 0 | 0 |
| 53 | 0 | 71 | 0 | | 134 | 0 | 0 | 0 |
| 54 | 0 | 72 | 0 | | 135 | 0 | 0 | 0 |
| 55 | 0 | 73 | 0 | | 136 | 0 | 0 | 0 |
| 56 | 0 | 74 | 0 | | 137 | 0 | 0 | 0 |
| 57 | 0 | 75 | 0 | | 138 | 0 | 0 | 0 |
| 58 | 0 | 17 | 0 | | 139 | 0 | 0 | 0 |
| 59 | 0 | 18 | 0 | | 140 | 0 | 0 | 0 |
| 60 | 0 | 19 | 0 | | 141 | 0 | 0 | 0 |
| 61 | 0 | 20 | 0 | | 142 | 0 | 0 | 0 |
| 62 | 0 | 21 | 0 | | 143 | 0 | 0 | 0 |
| 63 | 0 | 22 | 0 | | 144 | 0 | 0 | 0 |
| 64 | 0 | 23 | 0 | | 145 | 0 | 0 | 0 |
| 65 | 0 | 76 | 0 | | 146 | 0 | 0 | 0 |
| 66 | 0 | 77 | 0 | | 147 | 0 | 0 | 0 |
| 67 | 0 | 78 | 0 | | 148 | 0 | 0 | 0 |
| 68 | 0 | 79 | 0 | | 149 | 0 | 0 | 0 |
| 69 | 0 | 80 | 0 | | 150 | 0 | 0 | 0 |
| 70 | 0 | 81 | 0 | | 151 | 0 | 0 | 0 |
| 71 | 0 | 82 | 0 | | 152 | 0 | 0 | 0 |
| 72 | 0 | 83 | 0 | | 153 | 0 | 0 | 0 |
| 73 | 0 | 84 | 0 | | 154 | 0 | 0 | 0 |
| 74 | 0 | 85 | 0 | | 155 | 0 | 0 | 0 |
| 75 | 0 | 86 | 0 | | 156 | 0 | 0 | 0 |
| 76 | 0 | 87 | 0 | | 157 | 0 | 0 | 0 |
| 77 | 0 | 88 | 0 | | 158 | 0 | 0 | 0 |
| 78 | 0 | 89 | 0 | | 159 | 0 | 0 | 0 |
| 79 | 0 | 90 | 0 | | 160 | 0 | 1 | 0 |
| 80 | 0 | 91 | 0 | | 161 | 0 | 34 | 0 |
| 81 | 0 | 92 | 0 | | 162 | 0 | 35 | 0 |
| 82 | 0 | 93 | 0 | | 163 | 0 | 36 | 0 |
| 83 | 0 | 94 | 0 | | 164 | 0 | 37 | 0 |
| 84 | 0 | 96 | 0 | | 165 | 0 | 38 | 0 |
| 85 | 0 | 97 | 0 | | 166 | 0 | 39 | 0 |
| 86 | 0 | 98 | 0 | | 167 | 0 | 40 | 0 |
| 87 | 0 | 99 | 0 | | 168 | 0 | 41 | 0 |
| 88 | 0 | 100 | 0 | | 169 | 0 | 42 | 0 |
| 89 | 0 | 101 | 0 | | 170 | 0 | 43 | 0 |
| 90 | 0 | 102 | 0 | | 171 | 0 | 44 | 0 |
| 91 | 0 | 24 | 0 | | 172 | 0 | 45 | 0 |
| 92 | 0 | 25 | 0 | | 173 | 0 | 14 | 0 |
| 93 | 0 | 26 | 0 | | 174 | 0 | 46 | 0 |
| 94 | 0 | 27 | 0 | | 175 | 0 | 47 | 0 |
| 95 | 0 | 28 | 0 | | 176 | 0 | 48 | 0 |
| 96 | 0 | 29 | 0 | | 177 | 0 | 49 | 0 |
| 97 | 0 | 76 | 0 | | 178 | 0 | 50 | 0 |
| 98 | 0 | 77 | 0 | | 179 | 0 | 51 | 0 |
| 99 | 0 | 78 | 0 | | 180 | 0 | 52 | 0 |

APPENDIX E: SORT ENCODING TABLE (LANGUAGE 1) -continued

| | | | |
|---|---|---|---|
| 181 | 0 | 53 | 0 |
| 182 | 0 | 54 | 0 |
| 183 | 0 | 55 | 0 |
| 184 | 0 | 56 | 0 |
| 185 | 0 | 57 | 0 |
| 186 | 0 | 58 | 0 |
| 187 | 0 | 59 | 0 |
| 188 | 0 | 60 | 0 |
| 189 | 0 | 61 | 0 |
| 190 | 0 | 62 | 0 |
| 191 | 0 | 63 | 0 |
| 192 | 0 | 76 | 0 |
| 193 | 0 | 76 | 0 |
| 194 | 0 | 76 | 0 |
| 195 | 0 | 76 | 0 |
| 196 | 0 | 76 | 0 |
| 197 | 0 | 76 | 0 |
| 198 | 0 | 76 | 80 |
| 199 | 0 | 78 | 0 |
| 200 | 0 | 80 | 0 |
| 201 | 0 | 80 | 0 |
| 202 | 0 | 80 | 0 |
| 203 | 0 | 80 | 0 |
| 204 | 0 | 84 | 0 |
| 205 | 0 | 84 | 0 |
| 206 | 0 | 84 | 0 |
| 207 | 0 | 84 | 0 |
| 208 | 0 | 79 | 0 |
| 209 | 0 | 89 | 0 |
| 210 | 0 | 90 | 0 |
| 211 | 0 | 90 | 0 |
| 212 | 0 | 90 | 0 |
| 213 | 0 | 90 | 0 |
| 214 | 0 | 90 | 0 |
| 215 | 0 | 64 | 0 |
| 216 | 0 | 90 | 0 |
| 217 | 0 | 97 | 0 |
| 218 | 0 | 97 | 0 |
| 219 | 0 | 97 | 0 |
| 220 | 0 | 97 | 0 |
| 221 | 0 | 101 | 0 |
| 222 | 0 | 91 | 0 |
| 223 | 0 | 94 | 94 |
| 224 | 0 | 76 | 0 |
| 225 | 0 | 76 | 0 |
| 226 | 0 | 76 | 0 |
| 227 | 0 | 76 | 0 |
| 228 | 0 | 76 | 0 |
| 229 | 0 | 76 | 0 |
| 230 | 0 | 76 | 80 |
| 231 | 0 | 78 | 0 |
| 232 | 0 | 80 | 0 |
| 233 | 0 | 80 | 0 |
| 234 | 0 | 80 | 0 |
| 235 | 0 | 80 | 0 |
| 236 | 0 | 84 | 0 |
| 237 | 0 | 84 | 0 |
| 238 | 0 | 84 | 0 |
| 239 | 0 | 84 | 0 |
| 240 | 0 | 79 | 0 |
| 241 | 0 | 89 | 0 |
| 242 | 0 | 90 | 0 |
| 243 | 0 | 90 | 0 |
| 244 | 0 | 90 | 0 |
| 245 | 0 | 90 | 0 |
| 246 | 0 | 90 | 0 |
| 247 | 0 | 65 | 0 |
| 248 | 0 | 90 | 0 |
| 249 | 0 | 97 | 0 |
| 250 | 0 | 97 | 0 |
| 251 | 0 | 97 | 0 |
| 252 | 0 | 97 | 0 |
| 253 | 0 | 101 | 0 |
| 254 | 0 | 91 | 0 |
| 255 | 0 | 101 | 0 |

APPENDIX F: SORT ENCODING TABLE (LANGUAGE 2)

| | | | |
|---|---|---|---|
| 0 | 0 | 0 | 0 |
| 1 | 0 | 0 | 0 |
| 2 | 0 | 0 | 0 |
| 3 | 0 | 0 | 0 |
| 4 | 0 | 0 | 0 |
| 5 | 0 | 0 | 0 |
| 6 | 0 | 0 | 0 |
| 7 | 0 | 0 | 0 |
| 8 | 0 | 0 | 0 |
| 9 | 0 | 0 | 0 |
| 10 | 0 | 0 | 0 |
| 11 | 0 | 0 | 0 |
| 12 | 0 | 0 | 0 |
| 13 | 0 | 0 | 0 |
| 14 | 0 | 0 | 0 |
| 15 | 0 | 0 | 0 |
| 16 | 0 | 0 | 0 |
| 17 | 0 | 0 | 0 |
| 18 | 0 | 0 | 0 |
| 19 | 0 | 0 | 0 |
| 20 | 0 | 0 | 0 |
| 21 | 0 | 0 | 0 |
| 22 | 0 | 0 | 0 |
| 23 | 0 | 0 | 0 |
| 24 | 0 | 0 | 0 |
| 25 | 0 | 0 | 0 |
| 26 | 0 | 0 | 0 |
| 27 | 0 | 0 | 0 |
| 28 | 0 | 0 | 0 |
| 29 | 0 | 0 | 0 |
| 30 | 0 | 0 | 0 |
| 31 | 0 | 0 | 0 |
| 32 | 0 | 1 | 0 |
| 33 | 0 | 2 | 0 |
| 34 | 0 | 3 | 0 |
| 35 | 0 | 4 | 0 |
| 36 | 0 | 5 | 0 |
| 37 | 0 | 6 | 0 |
| 38 | 0 | 7 | 0 |
| 39 | 0 | 8 | 0 |
| 40 | 0 | 9 | 0 |
| 41 | 0 | 10 | 0 |
| 42 | 0 | 11 | 0 |
| 43 | 0 | 12 | 0 |
| 44 | 0 | 13 | 0 |
| 45 | 0 | 14 | 0 |
| 46 | 0 | 15 | 0 |
| 47 | 0 | 16 | 0 |
| 48 | 0 | 66 | 0 |
| 49 | 0 | 67 | 0 |
| 50 | 0 | 68 | 0 |
| 51 | 0 | 69 | 0 |
| 52 | 0 | 70 | 0 |
| 53 | 0 | 71 | 0 |
| 54 | 0 | 72 | 0 |
| 55 | 0 | 73 | 0 |
| 56 | 0 | 74 | 0 |
| 57 | 0 | 75 | 0 |
| 58 | 0 | 17 | 0 |
| 59 | 0 | 18 | 0 |
| 60 | 0 | 19 | 0 |
| 61 | 0 | 20 | 0 |
| 62 | 0 | 21 | 0 |
| 63 | 0 | 22 | 0 |
| 64 | 0 | 23 | 0 |
| 65 | 0 | 76 | 0 |
| 66 | 0 | 77 | 0 |
| 67 | 0 | 78 | 0 |
| 68 | 0 | 79 | 0 |
| 69 | 0 | 80 | 0 |
| 70 | 0 | 81 | 0 |
| 71 | 0 | 82 | 0 |
| 72 | 0 | 83 | 0 |
| 73 | 0 | 84 | 0 |
| 74 | 0 | 85 | 0 |
| 75 | 0 | 86 | 0 |
| 76 | 0 | 87 | 0 |
| 77 | 0 | 88 | 0 |
| 78 | 0 | 89 | 0 |
| 79 | 0 | 90 | 0 |
| 80 | 0 | 91 | 0 |

APPENDIX F: SORT ENCODING TABLE (LANGUAGE 2)

| | | | |
|---|---|---|---|
| 81 | 0 | 92 | 0 |
| 82 | 0 | 93 | 0 |
| 83 | 0 | 94 | 0 |
| 84 | 0 | 96 | 0 |
| 85 | 0 | 97 | 0 |
| 86 | 0 | 98 | 0 |
| 87 | 0 | 98 | 0 |
| 88 | 0 | 100 | 0 |
| 89 | 0 | 101 | 0 |
| 90 | 0 | 102 | 0 |
| 91 | 0 | 24 | 0 |
| 92 | 0 | 25 | 0 |
| 93 | 0 | 26 | 0 |
| 94 | 0 | 27 | 0 |
| 95 | 0 | 28 | 0 |
| 96 | 0 | 29 | 0 |
| 97 | 0 | 76 | 0 |
| 98 | 0 | 77 | 0 |
| 99 | 0 | 78 | 0 |
| 100 | 0 | 79 | 0 |
| 101 | 0 | 80 | 0 |
| 102 | 0 | 81 | 0 |
| 103 | 0 | 82 | 0 |
| 104 | 0 | 83 | 0 |
| 105 | 0 | 84 | 0 |
| 106 | 0 | 85 | 0 |
| 107 | 0 | 86 | 0 |
| 108 | 0 | 87 | 0 |
| 109 | 0 | 88 | 0 |
| 110 | 0 | 89 | 0 |
| 111 | 0 | 90 | 0 |
| 112 | 0 | 91 | 0 |
| 113 | 0 | 92 | 0 |
| 114 | 0 | 93 | 0 |
| 115 | 0 | 94 | 0 |
| 116 | 0 | 96 | 0 |
| 117 | 0 | 97 | 0 |
| 118 | 0 | 98 | 0 |
| 119 | 0 | 98 | 0 |
| 120 | 0 | 100 | 0 |
| 121 | 0 | 101 | 0 |
| 122 | 0 | 102 | 0 |
| 123 | 0 | 30 | 0 |
| 124 | 0 | 31 | 0 |
| 125 | 0 | 32 | 0 |
| 126 | 0 | 33 | 0 |
| 127 | 0 | 0 | 0 |
| 128 | 0 | 0 | 0 |
| 129 | 0 | 0 | 0 |
| 130 | 0 | 0 | 0 |
| 131 | 0 | 0 | 0 |
| 132 | 0 | 0 | 0 |
| 133 | 0 | 0 | 0 |
| 134 | 0 | 0 | 0 |
| 135 | 0 | 0 | 0 |
| 136 | 0 | 0 | 0 |
| 137 | 0 | 0 | 0 |
| 138 | 0 | 0 | 0 |
| 139 | 0 | 0 | 0 |
| 140 | 0 | 0 | 0 |
| 141 | 0 | 0 | 0 |
| 142 | 0 | 0 | 0 |
| 143 | 0 | 0 | 0 |
| 144 | 0 | 0 | 0 |
| 145 | 0 | 0 | 0 |
| 146 | 0 | 0 | 0 |
| 147 | 0 | 0 | 0 |
| 148 | 0 | 0 | 0 |
| 149 | 0 | 0 | 0 |
| 150 | 0 | 0 | 0 |
| 151 | 0 | 0 | 0 |
| 152 | 0 | 0 | 0 |
| 153 | 0 | 0 | 0 |
| 154 | 0 | 0 | 0 |
| 155 | 0 | 0 | 0 |
| 156 | 0 | 0 | 0 |
| 157 | 0 | 0 | 0 |
| 158 | 0 | 0 | 0 |
| 159 | 0 | 0 | 0 |
| 160 | 0 | 1 | 0 |
| 161 | 0 | 34 | 0 |
| 162 | 0 | 35 | 0 |
| 163 | 0 | 36 | 0 |
| 164 | 0 | 37 | 0 |
| 165 | 0 | 38 | 0 |
| 166 | 0 | 39 | 0 |
| 167 | 0 | 40 | 0 |
| 168 | 0 | 41 | 0 |
| 169 | 0 | 42 | 0 |
| 170 | 0 | 43 | 0 |
| 171 | 0 | 44 | 0 |
| 172 | 0 | 45 | 0 |
| 173 | 0 | 14 | 0 |
| 174 | 0 | 46 | 0 |
| 175 | 0 | 47 | 0 |
| 176 | 0 | 48 | 0 |
| 177 | 0 | 49 | 0 |
| 178 | 0 | 50 | 0 |
| 179 | 0 | 51 | 0 |
| 180 | 0 | 52 | 0 |
| 181 | 0 | 53 | 0 |
| 182 | 0 | 54 | 0 |
| 183 | 0 | 55 | 0 |
| 184 | 0 | 56 | 0 |
| 185 | 0 | 57 | 0 |
| 186 | 0 | 58 | 0 |
| 187 | 0 | 59 | 0 |
| 188 | 0 | 60 | 0 |
| 189 | 0 | 61 | 0 |
| 190 | 0 | 62 | 0 |
| 191 | 0 | 63 | 0 |
| 192 | 0 | 76 | 0 |
| 193 | 0 | 76 | 0 |
| 194 | 0 | 76 | 0 |
| 195 | 0 | 76 | 0 |
| 196 | 0 | 105 | 0 |
| 197 | 0 | 104 | 0 |
| 198 | 0 | 105 | 0 |
| 199 | 0 | 78 | 0 |
| 200 | 0 | 80 | 0 |
| 201 | 0 | 80 | 0 |
| 202 | 0 | 80 | 0 |
| 203 | 0 | 80 | 0 |
| 204 | 0 | 84 | 0 |
| 205 | 0 | 84 | 0 |
| 206 | 0 | 84 | 0 |
| 207 | 0 | 84 | 0 |
| 208 | 0 | 79 | 0 |
| 209 | 0 | 89 | 0 |
| 210 | 0 | 90 | 0 |
| 211 | 0 | 90 | 0 |
| 212 | 0 | 90 | 0 |
| 213 | 0 | 90 | 0 |
| 214 | 0 | 106 | 0 |
| 215 | 0 | 64 | 0 |
| 216 | 0 | 106 | 0 |
| 217 | 0 | 97 | 0 |
| 218 | 0 | 97 | 0 |
| 219 | 0 | 97 | 0 |
| 220 | 0 | 101 | 0 |
| 221 | 0 | 101 | 0 |
| 222 | 0 | 91 | 0 |
| 223 | 0 | 94 | 94 |
| 224 | 0 | 76 | 0 |
| 225 | 0 | 76 | 0 |
| 226 | 0 | 76 | 0 |
| 227 | 0 | 76 | 0 |
| 228 | 0 | 105 | 0 |
| 229 | 0 | 104 | 0 |
| 230 | 0 | 105 | 0 |
| 231 | 0 | 78 | 0 |
| 232 | 0 | 80 | 0 |
| 233 | 0 | 80 | 0 |
| 234 | 0 | 80 | 0 |
| 235 | 0 | 80 | 0 |
| 236 | 0 | 84 | 0 |
| 237 | 0 | 84 | 0 |
| 238 | 0 | 84 | 0 |
| 239 | 0 | 84 | 0 |
| 240 | 0 | 79 | 0 |
| 241 | 0 | 89 | 0 |
| 242 | 0 | 90 | 0 |

APPENDIX F: SORT ENCODING TABLE (LANGUAGE 2)

| | | | |
|---|---|---|---|
| 243 | 0 | 90 | 0 |
| 244 | 0 | 90 | 0 |
| 245 | 0 | 90 | 0 |
| 246 | 0 | 106 | 0 |
| 247 | 0 | 65 | 0 |
| 248 | 0 | 106 | 0 |
| 249 | 0 | 97 | 0 |
| 250 | 0 | 97 | 0 |
| 251 | 0 | 97 | 0 |
| 252 | 0 | 101 | 0 |
| 253 | 0 | 101 | 0 |
| 254 | 0 | 91 | 0 |
| 255 | 10 | 101 | 0 |

APPENDIX G: SORT ENCODING TABLE (LANGUAGE 3)

| | | | |
|---|---|---|---|
| 0 | 0 | 0 | 0 |
| 1 | 0 | 0 | 0 |
| 2 | 0 | 0 | 0 |
| 3 | 0 | 0 | 0 |
| 4 | 0 | 0 | 0 |
| 5 | 0 | 0 | 0 |
| 6 | 0 | 0 | 0 |
| 7 | 0 | 0 | 0 |
| 8 | 0 | 0 | 0 |
| 9 | 0 | 0 | 0 |
| 10 | 0 | 0 | 0 |
| 11 | 0 | 0 | 0 |
| 12 | 0 | 0 | 0 |
| 13 | 0 | 0 | 0 |
| 14 | 0 | 0 | 0 |
| 15 | 0 | 0 | 0 |
| 16 | 0 | 0 | 0 |
| 17 | 0 | 0 | 0 |
| 18 | 0 | 0 | 0 |
| 19 | 0 | 0 | 0 |
| 20 | 0 | 0 | 0 |
| 21 | 0 | 0 | 0 |
| 22 | 0 | 0 | 0 |
| 23 | 0 | 0 | 0 |
| 24 | 0 | 0 | 0 |
| 25 | 0 | 0 | 0 |
| 26 | 0 | 0 | 0 |
| 27 | 0 | 0 | 0 |
| 28 | 0 | 0 | 0 |
| 29 | 0 | 0 | 0 |
| 30 | 0 | 0 | 0 |
| 31 | 0 | 0 | 0 |
| 32 | 0 | 1 | 0 |
| 33 | 0 | 2 | 0 |
| 34 | 0 | 3 | 0 |
| 35 | 0 | 4 | 0 |
| 36 | 0 | 5 | 0 |
| 37 | 0 | 6 | 0 |
| 38 | 0 | 7 | 0 |
| 39 | 0 | 8 | 0 |
| 40 | 0 | 9 | 0 |
| 41 | 0 | 10 | 0 |
| 42 | 0 | 11 | 0 |
| 43 | 0 | 12 | 0 |
| 44 | 0 | 13 | 0 |
| 45 | 0 | 14 | 0 |
| 46 | 0 | 15 | 0 |
| 47 | 0 | 16 | 0 |
| 48 | 0 | 66 | 0 |
| 49 | 0 | 67 | 0 |
| 50 | 0 | 68 | 0 |
| 51 | 0 | 69 | 0 |
| 52 | 0 | 70 | 0 |
| 53 | 0 | 71 | 0 |
| 54 | 0 | 72 | 0 |
| 55 | 0 | 73 | 0 |
| 56 | 0 | 74 | 0 |
| 57 | 0 | 75 | 0 |
| 58 | 0 | 17 | 0 |
| 59 | 0 | 18 | 0 |
| 60 | 0 | 19 | 0 |
| 61 | 0 | 20 | 0 |
| 62 | 0 | 21 | 0 |
| 63 | 0 | 22 | 0 |
| 64 | 0 | 23 | 0 |
| 65 | 0 | 76 | 0 |
| 66 | 0 | 77 | 0 |
| 67 | 0 | 78 | 0 |
| 68 | 0 | 79 | 0 |
| 69 | 0 | 80 | 0 |
| 70 | 0 | 81 | 0 |
| 71 | 0 | 82 | 0 |
| 72 | 0 | 83 | 0 |
| 73 | 0 | 84 | 0 |
| 74 | 0 | 85 | 0 |
| 75 | 0 | 86 | 0 |
| 76 | 0 | 87 | 0 |
| 77 | 0 | 88 | 0 |
| 78 | 0 | 89 | 0 |
| 79 | 0 | 90 | 0 |
| 80 | 0 | 91 | 0 |
| 81 | 0 | 92 | 0 |
| 82 | 0 | 93 | 0 |
| 83 | 0 | 94 | 0 |
| 84 | 0 | 96 | 0 |
| 85 | 0 | 97 | 0 |
| 86 | 0 | 98 | 0 |
| 87 | 0 | 99 | 0 |
| 88 | 0 | 100 | 0 |
| 89 | 0 | 101 | 0 |
| 90 | 0 | 102 | 0 |
| 91 | 0 | 24 | 0 |
| 92 | 0 | 25 | 0 |
| 93 | 0 | 26 | 0 |
| 94 | 0 | 27 | 0 |
| 95 | 0 | 28 | 0 |
| 96 | 0 | 29 | 0 |
| 97 | 0 | 76 | 0 |
| 98 | 0 | 77 | 0 |
| 99 | 0 | 78 | 0 |
| 100 | 0 | 79 | 0 |
| 101 | 0 | 80 | 0 |
| 102 | 0 | 81 | 0 |
| 103 | 0 | 82 | 0 |
| 104 | 0 | 83 | 0 |
| 105 | 0 | 84 | 0 |
| 106 | 0 | 85 | 0 |
| 107 | 0 | 86 | 0 |
| 108 | 0 | 87 | 0 |
| 109 | 0 | 88 | 0 |
| 110 | 0 | 89 | 0 |
| 111 | 0 | 90 | 0 |
| 112 | 0 | 91 | 0 |
| 113 | 0 | 92 | 0 |
| 114 | 0 | 93 | 0 |
| 115 | 0 | 94 | 0 |
| 116 | 0 | 96 | 0 |
| 117 | 0 | 97 | 0 |
| 118 | 0 | 98 | 0 |
| 119 | 0 | 99 | 0 |
| 120 | 0 | 100 | 0 |
| 121 | 0 | 101 | 0 |
| 122 | 0 | 102 | 0 |
| 123 | 0 | 30 | 0 |
| 124 | 0 | 31 | 0 |
| 125 | 0 | 32 | 0 |
| 126 | 0 | 33 | 0 |
| 127 | 0 | 0 | 0 |
| 128 | 0 | 0 | 0 |
| 129 | 0 | 0 | 0 |
| 130 | 0 | 0 | 0 |
| 131 | 0 | 0 | 0 |
| 132 | 0 | 0 | 0 |
| 133 | 0 | 0 | 0 |
| 134 | 0 | 0 | 0 |
| 135 | 0 | 0 | 0 |
| 136 | 0 | 0 | 0 |
| 137 | 0 | 0 | 0 |
| 138 | 0 | 0 | 0 |
| 139 | 0 | 0 | 0 |
| 140 | 0 | 0 | 0 |
| 141 | 0 | 0 | 0 |
| 142 | 0 | 0 | 0 |

APPENDIX G: SORT ENCODING TABLE (LANGUAGE 3) -continued

| | | | |
|---|---|---|---|
| 143 | 0 | 0 | 0 |
| 144 | 0 | 0 | 0 |
| 145 | 0 | 0 | 0 |
| 146 | 0 | 0 | 0 |
| 147 | 0 | 0 | 0 |
| 148 | 0 | 0 | 0 |
| 149 | 0 | 0 | 0 |
| 150 | 0 | 0 | 0 |
| 151 | 0 | 0 | 0 |
| 152 | 0 | 0 | 0 |
| 153 | 0 | 0 | 0 |
| 154 | 0 | 0 | 0 |
| 155 | 0 | 0 | 0 |
| 156 | 0 | 0 | 0 |
| 157 | 0 | 0 | 0 |
| 158 | 0 | 0 | 0 |
| 159 | 0 | 0 | 0 |
| 160 | 0 | 1 | 0 |
| 161 | 0 | 34 | 0 |
| 162 | 0 | 35 | 0 |
| 163 | 0 | 36 | 0 |
| 164 | 0 | 37 | 0 |
| 165 | 0 | 38 | 0 |
| 166 | 0 | 39 | 0 |
| 167 | 0 | 40 | 0 |
| 168 | 0 | 41 | 0 |
| 169 | 0 | 42 | 0 |
| 170 | 0 | 43 | 0 |
| 171 | 0 | 44 | 0 |
| 172 | 0 | 45 | 0 |
| 173 | 0 | 14 | 0 |
| 174 | 0 | 46 | 0 |
| 175 | 0 | 47 | 0 |
| 176 | 0 | 48 | 0 |
| 177 | 0 | 49 | 0 |
| 178 | 0 | 50 | 0 |
| 179 | 0 | 51 | 0 |
| 180 | 0 | 52 | 0 |
| 181 | 0 | 53 | 0 |
| 182 | 0 | 54 | 0 |
| 183 | 0 | 55 | 0 |
| 184 | 0 | 56 | 0 |
| 185 | 0 | 57 | 0 |
| 186 | 0 | 58 | 0 |
| 187 | 0 | 59 | 0 |
| 188 | 0 | 60 | 0 |
| 189 | 0 | 61 | 0 |
| 190 | 0 | 62 | 0 |
| 191 | 0 | 63 | 0 |
| 192 | 0 | 76 | 0 |
| 193 | 0 | 76 | 0 |
| 194 | 0 | 76 | 0 |
| 195 | 0 | 76 | 0 |
| 196 | 0 | 76 | 0 |
| 197 | 0 | 76 | 0 |
| 198 | 0 | 76 | 80 |
| 199 | 0 | 78 | 0 |
| 200 | 0 | 80 | 0 |
| 201 | 0 | 80 | 0 |
| 202 | 0 | 80 | 0 |
| 203 | 0 | 80 | 0 |
| 204 | 0 | 84 | 0 |
| 205 | 0 | 84 | 0 |
| 206 | 0 | 84 | 0 |
| 207 | 0 | 84 | 0 |
| 208 | 0 | 79 | 0 |
| 209 | 0 | 89 | 0 |
| 210 | 0 | 90 | 0 |
| 211 | 0 | 90 | 0 |
| 212 | 0 | 90 | 0 |
| 213 | 0 | 90 | 0 |
| 214 | 0 | 90 | 0 |
| 215 | 0 | 64 | 0 |
| 216 | 0 | 90 | 0 |
| 217 | 0 | 97 | 0 |
| 218 | 0 | 97 | 0 |
| 219 | 0 | 97 | 0 |
| 220 | 0 | 97 | 0 |
| 221 | 0 | 101 | 0 |
| 222 | 0 | 91 | 0 |
| 223 | 0 | 95 | 0 |
| 224 | 0 | 76 | 0 |
| 225 | 0 | 76 | 0 |
| 226 | 0 | 76 | 0 |
| 227 | 0 | 76 | 0 |
| 228 | 0 | 76 | 0 |
| 229 | 0 | 76 | 0 |
| 230 | 0 | 76 | 80 |
| 231 | 0 | 78 | 0 |
| 232 | 0 | 80 | 0 |
| 233 | 0 | 80 | 0 |
| 234 | 0 | 80 | 0 |
| 235 | 0 | 80 | 0 |
| 236 | 0 | 84 | 0 |
| 237 | 0 | 84 | 0 |
| 238 | 0 | 84 | 0 |
| 239 | 0 | 84 | 0 |
| 240 | 0 | 79 | 0 |
| 241 | 0 | 89 | 0 |
| 242 | 0 | 90 | 0 |
| 243 | 0 | 90 | 0 |
| 244 | 0 | 90 | 0 |
| 245 | 0 | 90 | 0 |
| 246 | 0 | 90 | 0 |
| 247 | 0 | 65 | 0 |
| 248 | 0 | 90 | 0 |
| 249 | 0 | 97 | 0 |
| 250 | 0 | 97 | 0 |
| 251 | 0 | 97 | 0 |
| 252 | 0 | 97 | 0 |
| 253 | 0 | 101 | 0 |
| 254 | 0 | 91 | 0 |
| 255 | 0 | 101 | 0 |

APPENDIX H: MATCH ENCODING TABLE (LANGUAGE 1)

| | | |
|---|---|---|
| 0 | 0 | 0 |
| 1 | 0 | 0 |
| 2 | 0 | 0 |
| 3 | 0 | 0 |
| 4 | 0 | 0 |
| 5 | 0 | 0 |
| 6 | 0 | 0 |
| 7 | 0 | 0 |
| 8 | 0 | 0 |
| 9 | 0 | 0 |
| 10 | 0 | 0 |
| 11 | 0 | 0 |
| 12 | 0 | 0 |
| 13 | 0 | 0 |
| 14 | 0 | 0 |
| 15 | 0 | 0 |
| 16 | 0 | 0 |
| 17 | 0 | 0 |
| 18 | 0 | 0 |
| 19 | 0 | 0 |
| 20 | 0 | 0 |
| 21 | 0 | 0 |
| 22 | 0 | 0 |
| 23 | 0 | 0 |
| 24 | 0 | 0 |
| 25 | 0 | 0 |
| 26 | 0 | 0 |
| 27 | 0 | 0 |
| 28 | 0 | 0 |
| 29 | 0 | 0 |
| 30 | 0 | 0 |
| 31 | 0 | 0 |
| 32 | 32 | 0 |
| 33 | 33 | 0 |
| 34 | 34 | 0 |
| 35 | 35 | 0 |
| 36 | 36 | 0 |
| 37 | 37 | 0 |
| 38 | 38 | 0 |
| 39 | 39 | 0 |
| 40 | 40 | 0 |
| 41 | 41 | 0 |

APPENDIX H: MATCH ENCODING TABLE (LANGUAGE 1)

| | | |
|---|---|---|
| 42 | 42 | 0 |
| 43 | 43 | 0 |
| 44 | 44 | 0 |
| 45 | 45 | 0 |
| 46 | 46 | 0 |
| 47 | 47 | 0 |
| 48 | 48 | 0 |
| 49 | 49 | 0 |
| 50 | 50 | 0 |
| 51 | 51 | 0 |
| 52 | 52 | 0 |
| 53 | 53 | 0 |
| 54 | 54 | 0 |
| 55 | 55 | 0 |
| 56 | 56 | 0 |
| 57 | 57 | 0 |
| 58 | 58 | 0 |
| 59 | 59 | 0 |
| 60 | 60 | 0 |
| 61 | 61 | 0 |
| 62 | 62 | 0 |
| 63 | 63 | 0 |
| 64 | 64 | 0 |
| 65 | 65 | 0 |
| 66 | 66 | 0 |
| 67 | 67 | 0 |
| 68 | 68 | 0 |
| 69 | 69 | 0 |
| 70 | 70 | 0 |
| 71 | 71 | 0 |
| 72 | 72 | 0 |
| 73 | 73 | 0 |
| 74 | 74 | 0 |
| 75 | 75 | 0 |
| 76 | 76 | 0 |
| 77 | 77 | 0 |
| 78 | 78 | 0 |
| 79 | 79 | 0 |
| 80 | 80 | 0 |
| 81 | 81 | 0 |
| 82 | 82 | 0 |
| 83 | 83 | 0 |
| 84 | 84 | 0 |
| 85 | 85 | 0 |
| 86 | 86 | 0 |
| 87 | 87 | 0 |
| 88 | 88 | 0 |
| 89 | 89 | 0 |
| 90 | 90 | 0 |
| 91 | 91 | 0 |
| 92 | 92 | 0 |
| 93 | 93 | 0 |
| 94 | 94 | 0 |
| 95 | 95 | 0 |
| 96 | 96 | 0 |
| 97 | 65 | 0 |
| 98 | 66 | 0 |
| 99 | 67 | 0 |
| 100 | 68 | 0 |
| 101 | 69 | 0 |
| 102 | 70 | 0 |
| 103 | 71 | 0 |
| 104 | 72 | 0 |
| 105 | 73 | 0 |
| 106 | 74 | 0 |
| 107 | 75 | 0 |
| 108 | 76 | 0 |
| 109 | 77 | 0 |
| 110 | 78 | 0 |
| 111 | 79 | 0 |
| 112 | 80 | 0 |
| 113 | 81 | 0 |
| 114 | 82 | 0 |
| 115 | 83 | 0 |
| 116 | 84 | 0 |
| 117 | 85 | 0 |
| 118 | 86 | 0 |
| 119 | 87 | 0 |
| 120 | 88 | 0 |
| 121 | 89 | 0 |
| 122 | 90 | 0 |
| 123 | 123 | 0 |
| 124 | 124 | 0 |
| 125 | 125 | 0 |
| 126 | 126 | 0 |
| 127 | 0 | 0 |
| 128 | 0 | 0 |
| 129 | 0 | 0 |
| 130 | 0 | 0 |
| 131 | 0 | 0 |
| 132 | 0 | 0 |
| 133 | 0 | 0 |
| 134 | 0 | 0 |
| 135 | 0 | 0 |
| 136 | 0 | 0 |
| 137 | 0 | 0 |
| 138 | 0 | 0 |
| 139 | 0 | 0 |
| 140 | 0 | 0 |
| 141 | 0 | 0 |
| 142 | 0 | 0 |
| 143 | 0 | 0 |
| 144 | 0 | 0 |
| 145 | 0 | 0 |
| 146 | 0 | 0 |
| 147 | 0 | 0 |
| 148 | 0 | 0 |
| 149 | 0 | 0 |
| 150 | 0 | 0 |
| 151 | 0 | 0 |
| 152 | 0 | 0 |
| 153 | 0 | 0 |
| 154 | 0 | 0 |
| 155 | 0 | 0 |
| 156 | 0 | 0 |
| 157 | 0 | 0 |
| 158 | 0 | 0 |
| 159 | 0 | 0 |
| 160 | 32 | 0 |
| 161 | 161 | 0 |
| 162 | 162 | 0 |
| 163 | 163 | 0 |
| 164 | 164 | 0 |
| 165 | 165 | 0 |
| 166 | 166 | 0 |
| 167 | 167 | 0 |
| 168 | 168 | 0 |
| 169 | 169 | 0 |
| 170 | 170 | 0 |
| 171 | 171 | 0 |
| 172 | 172 | 0 |
| 173 | 45 | 0 |
| 174 | 174 | 0 |
| 175 | 175 | 0 |
| 176 | 176 | 0 |
| 177 | 177 | 0 |
| 178 | 178 | 0 |
| 179 | 179 | 0 |
| 180 | 180 | 0 |
| 181 | 181 | 0 |
| 182 | 182 | 0 |
| 183 | 183 | 0 |
| 184 | 184 | 0 |
| 185 | 185 | 0 |
| 186 | 186 | 0 |
| 187 | 187 | 0 |
| 188 | 188 | 0 |
| 189 | 189 | 0 |
| 190 | 190 | 0 |
| 191 | 191 | 0 |
| 192 | 65 | 0 |
| 193 | 65 | 0 |
| 194 | 65 | 0 |
| 195 | 65 | 0 |
| 196 | 65 | 0 |
| 197 | 65 | 0 |
| 198 | 65 | 69 |
| 199 | 67 | 0 |
| 200 | 69 | 0 |
| 201 | 69 | 0 |

APPENDIX H: MATCH ENCODING TABLE (LANGUAGE 1) -continued

| | | |
|---|---|---|
| 202 | 69 | 0 |
| 203 | 69 | 0 |
| 204 | 73 | 0 |
| 205 | 73 | 0 |
| 206 | 73 | 0 |
| 207 | 73 | 0 |
| 208 | 68 | 0 |
| 209 | 78 | 0 |
| 210 | 79 | 0 |
| 211 | 79 | 0 |
| 212 | 79 | 0 |
| 213 | 79 | 0 |
| 214 | 79 | 0 |
| 215 | 215 | 0 |
| 216 | 79 | 0 |
| 217 | 85 | 0 |
| 218 | 85 | 0 |
| 219 | 85 | 0 |
| 220 | 85 | 0 |
| 221 | 89 | 0 |
| 222 | 80 | 0 |
| 223 | 83 | 83 |
| 224 | 65 | 0 |
| 225 | 65 | 0 |
| 226 | 65 | 0 |
| 227 | 65 | 0 |
| 228 | 65 | 0 |
| 229 | 65 | 0 |
| 230 | 65 | 69 |
| 231 | 67 | 0 |
| 232 | 69 | 0 |
| 233 | 69 | 0 |
| 234 | 69 | 0 |
| 235 | 69 | 0 |
| 236 | 73 | 0 |
| 237 | 73 | 0 |
| 238 | 73 | 0 |
| 239 | 73 | 0 |
| 240 | 68 | 0 |
| 241 | 78 | 0 |
| 242 | 79 | 0 |
| 243 | 79 | 0 |
| 244 | 79 | 0 |
| 245 | 79 | 0 |
| 246 | 79 | 0 |
| 247 | 247 | 0 |
| 248 | 79 | 0 |
| 249 | 85 | 0 |
| 250 | 85 | 0 |
| 251 | 85 | 0 |
| 252 | 85 | 0 |
| 253 | 89 | 0 |
| 254 | 80 | 0 |
| 255 | 89 | 0 |

APPENDIX I: MATCH ENCODING TABLE (LANGUAGE 2)

| | | |
|---|---|---|
| 0 | 0 | 0 |
| 1 | 0 | 0 |
| 2 | 0 | 0 |
| 3 | 0 | 0 |
| 4 | 0 | 0 |
| 5 | 0 | 0 |
| 6 | 0 | 0 |
| 7 | 0 | 0 |
| 8 | 0 | 0 |
| 9 | 0 | 0 |
| 10 | 0 | 0 |
| 11 | 0 | 0 |
| 12 | 0 | 0 |
| 13 | 0 | 0 |
| 14 | 0 | 0 |
| 15 | 0 | 0 |
| 16 | 0 | 0 |
| 17 | 0 | 0 |
| 18 | 0 | 0 |
| 19 | 0 | 0 |
| 20 | 0 | 0 |
| 21 | 0 | 0 |
| 22 | 0 | 0 |
| 23 | 0 | 0 |
| 24 | 0 | 0 |
| 25 | 0 | 0 |
| 26 | 0 | 0 |
| 27 | 0 | 0 |
| 28 | 0 | 0 |
| 29 | 0 | 0 |
| 30 | 0 | 0 |
| 31 | 0 | 0 |
| 32 | 32 | 0 |
| 33 | 33 | 0 |
| 34 | 34 | 0 |
| 35 | 35 | 0 |
| 36 | 36 | 0 |
| 37 | 37 | 0 |
| 38 | 38 | 0 |
| 39 | 39 | 0 |
| 40 | 40 | 0 |
| 41 | 41 | 0 |
| 42 | 42 | 0 |
| 43 | 43 | 0 |
| 44 | 44 | 0 |
| 45 | 45 | 0 |
| 46 | 46 | 0 |
| 47 | 47 | 0 |
| 48 | 48 | 0 |
| 49 | 49 | 0 |
| 50 | 50 | 0 |
| 51 | 51 | 0 |
| 52 | 52 | 0 |
| 53 | 53 | 0 |
| 54 | 54 | 0 |
| 55 | 55 | 0 |
| 56 | 56 | 0 |
| 57 | 57 | 0 |
| 58 | 58 | 0 |
| 59 | 59 | 0 |
| 60 | 60 | 0 |
| 61 | 61 | 0 |
| 62 | 62 | 0 |
| 63 | 63 | 0 |
| 64 | 64 | 0 |
| 65 | 65 | 0 |
| 66 | 66 | 0 |
| 67 | 67 | 0 |
| 68 | 68 | 0 |
| 69 | 69 | 0 |
| 70 | 70 | 0 |
| 71 | 71 | 0 |
| 72 | 72 | 0 |
| 73 | 73 | 0 |
| 74 | 74 | 0 |
| 75 | 75 | 0 |
| 76 | 76 | 0 |
| 77 | 77 | 0 |
| 78 | 78 | 0 |
| 79 | 79 | 0 |
| 80 | 80 | 0 |
| 81 | 81 | 0 |
| 82 | 82 | 0 |
| 83 | 83 | 0 |
| 84 | 84 | 0 |
| 85 | 85 | 0 |
| 86 | 86 | 0 |
| 87 | 87 | 0 |
| 88 | 88 | 0 |
| 89 | 89 | 0 |
| 90 | 90 | 0 |
| 91 | 91 | 0 |
| 92 | 92 | 0 |
| 93 | 93 | 0 |
| 94 | 94 | 0 |
| 95 | 95 | 0 |
| 96 | 96 | 0 |
| 97 | 65 | 0 |
| 98 | 66 | 0 |

APPENDIX I: MATCH ENCODING TABLE (LANGUAGE 2)

| | | |
|---|---|---|
| 99 | 67 | 0 |
| 100 | 68 | 0 |
| 101 | 69 | 0 |
| 102 | 70 | 0 |
| 103 | 71 | 0 |
| 104 | 72 | 0 |
| 105 | 73 | 0 |
| 106 | 74 | 0 |
| 107 | 75 | 0 |
| 108 | 76 | 0 |
| 109 | 77 | 0 |
| 110 | 78 | 0 |
| 111 | 79 | 0 |
| 112 | 80 | 0 |
| 113 | 81 | 0 |
| 114 | 82 | 0 |
| 115 | 83 | 0 |
| 116 | 84 | 0 |
| 117 | 85 | 0 |
| 118 | 86 | 0 |
| 119 | 87 | 0 |
| 120 | 88 | 0 |
| 121 | 89 | 0 |
| 122 | 90 | 0 |
| 123 | 123 | 0 |
| 124 | 124 | 0 |
| 125 | 125 | 0 |
| 126 | 126 | 0 |
| 127 | 0 | 0 |
| 128 | 0 | 0 |
| 129 | 0 | 0 |
| 130 | 0 | 0 |
| 131 | 0 | 0 |
| 132 | 0 | 0 |
| 133 | 0 | 0 |
| 134 | 0 | 0 |
| 135 | 0 | 0 |
| 136 | 0 | 0 |
| 137 | 0 | 0 |
| 138 | 0 | 0 |
| 139 | 0 | 0 |
| 140 | 0 | 0 |
| 141 | 0 | 0 |
| 142 | 0 | 0 |
| 143 | 0 | 0 |
| 144 | 0 | 0 |
| 145 | 0 | 0 |
| 146 | 0 | 0 |
| 147 | 0 | 0 |
| 148 | 0 | 0 |
| 149 | 0 | 0 |
| 150 | 0 | 0 |
| 151 | 0 | 0 |
| 152 | 0 | 0 |
| 153 | 0 | 0 |
| 154 | 0 | 0 |
| 155 | 0 | 0 |
| 156 | 0 | 0 |
| 157 | 0 | 0 |
| 158 | 0 | 0 |
| 159 | 0 | 0 |
| 160 | 32 | 0 |
| 161 | 161 | 0 |
| 162 | 162 | 0 |
| 163 | 163 | 0 |
| 164 | 164 | 0 |
| 165 | 165 | 0 |
| 166 | 166 | 0 |
| 167 | 167 | 0 |
| 168 | 168 | 0 |
| 169 | 169 | 0 |
| 170 | 170 | 0 |
| 171 | 171 | 0 |
| 172 | 172 | 0 |
| 173 | 45 | 0 |
| 174 | 174 | 0 |
| 175 | 175 | 0 |
| 176 | 176 | 0 |
| 177 | 177 | 0 |
| 178 | 178 | 0 |
| 179 | 179 | 0 |
| 180 | 180 | 0 |
| 181 | 181 | 0 |
| 182 | 182 | 0 |
| 183 | 183 | 0 |
| 184 | 184 | 0 |
| 185 | 185 | 0 |
| 186 | 186 | 0 |
| 187 | 187 | 0 |
| 188 | 188 | 0 |
| 189 | 189 | 0 |
| 190 | 190 | 0 |
| 191 | 191 | 0 |
| 192 | 65 | 0 |
| 193 | 65 | 0 |
| 194 | 65 | 0 |
| 195 | 65 | 0 |
| 196 | 196 | 0 |
| 197 | 197 | 0 |
| 198 | 196 | 0 |
| 199 | 67 | 0 |
| 200 | 69 | 0 |
| 201 | 201 | 0 |
| 202 | 69 | 0 |
| 203 | 69 | 0 |
| 204 | 73 | 0 |
| 205 | 73 | 0 |
| 206 | 73 | 0 |
| 207 | 73 | 0 |
| 208 | 68 | 0 |
| 209 | 78 | 0 |
| 210 | 79 | 0 |
| 211 | 79 | 0 |
| 212 | 79 | 0 |
| 213 | 79 | 0 |
| 214 | 214 | 0 |
| 215 | 215 | 0 |
| 216 | 214 | 0 |
| 217 | 85 | 0 |
| 218 | 85 | 0 |
| 219 | 85 | 0 |
| 220 | 220 | 0 |
| 221 | 89 | 0 |
| 222 | 80 | 0 |
| 223 | 83 | 83 |
| 224 | 65 | 0 |
| 225 | 65 | 0 |
| 226 | 65 | 0 |
| 227 | 65 | 0 |
| 228 | 196 | 0 |
| 229 | 197 | 0 |
| 230 | 196 | 0 |
| 231 | 67 | 0 |
| 232 | 69 | 0 |
| 233 | 201 | 0 |
| 234 | 69 | 0 |
| 235 | 69 | 0 |
| 236 | 73 | 0 |
| 237 | 73 | 0 |
| 238 | 73 | 0 |
| 239 | 73 | 0 |
| 240 | 68 | 0 |
| 241 | 78 | 0 |
| 242 | 79 | 0 |
| 243 | 79 | 0 |
| 244 | 79 | 0 |
| 245 | 79 | 0 |
| 246 | 214 | 0 |
| 247 | 247 | 0 |
| 248 | 214 | 0 |
| 249 | 85 | 0 |
| 250 | 85 | 0 |
| 251 | 85 | 0 |
| 252 | 220 | 0 |
| 253 | 89 | 0 |
| 254 | 80 | 0 |
| 255 | 89 | 0 |

APPENDIX J: MATCH ENCODING TABLE (LANGUAGE 3)

| | | |
|---|---|---|
| 0 | 0 | 0 |
| 1 | 0 | 0 |
| 2 | 0 | 0 |
| 3 | 0 | 0 |
| 4 | 0 | 0 |
| 5 | 0 | 0 |
| 6 | 0 | 0 |
| 7 | 0 | 0 |
| 8 | 0 | 0 |
| 9 | 0 | 0 |
| 10 | 0 | 0 |
| 11 | 0 | 0 |
| 12 | 0 | 0 |
| 13 | 0 | 0 |
| 14 | 0 | 0 |
| 15 | 0 | 0 |
| 16 | 0 | 0 |
| 17 | 0 | 0 |
| 18 | 0 | 0 |
| 19 | 0 | 0 |
| 20 | 0 | 0 |
| 21 | 0 | 0 |
| 22 | 0 | 0 |
| 23 | 0 | 0 |
| 24 | 0 | 0 |
| 25 | 0 | 0 |
| 26 | 0 | 0 |
| 27 | 0 | 0 |
| 28 | 0 | 0 |
| 29 | 0 | 0 |
| 30 | 0 | 0 |
| 31 | 0 | 0 |
| 32 | 32 | 0 |
| 33 | 33 | 0 |
| 34 | 34 | 0 |
| 35 | 35 | 0 |
| 36 | 36 | 0 |
| 37 | 37 | 0 |
| 38 | 38 | 0 |
| 39 | 39 | 0 |
| 40 | 40 | 0 |
| 41 | 41 | 0 |
| 42 | 42 | 0 |
| 43 | 43 | 0 |
| 44 | 44 | 0 |
| 45 | 45 | 0 |
| 46 | 46 | 0 |
| 47 | 47 | 0 |
| 48 | 48 | 0 |
| 49 | 49 | 0 |
| 50 | 50 | 0 |
| 51 | 51 | 0 |
| 52 | 52 | 0 |
| 53 | 53 | 0 |
| 54 | 54 | 0 |
| 55 | 55 | 0 |
| 56 | 56 | 0 |
| 57 | 57 | 0 |
| 58 | 58 | 0 |
| 59 | 59 | 0 |
| 60 | 60 | 0 |
| 61 | 61 | 0 |
| 62 | 62 | 0 |
| 63 | 63 | 0 |
| 64 | 64 | 0 |
| 65 | 65 | 0 |
| 66 | 66 | 0 |
| 67 | 67 | 0 |
| 68 | 68 | 0 |
| 69 | 69 | 0 |
| 70 | 70 | 0 |
| 71 | 71 | 0 |
| 72 | 72 | 0 |
| 73 | 73 | 0 |
| 74 | 74 | 0 |
| 75 | 75 | 0 |
| 76 | 76 | 0 |
| 77 | 77 | 0 |
| 78 | 78 | 0 |
| 79 | 79 | 0 |
| 80 | 80 | 0 |
| 81 | 81 | 0 |
| 82 | 82 | 0 |
| 83 | 83 | 0 |
| 84 | 84 | 0 |
| 85 | 85 | 0 |
| 86 | 86 | 0 |
| 87 | 87 | 0 |
| 88 | 88 | 0 |
| 89 | 89 | 0 |
| 90 | 90 | 0 |
| 91 | 91 | 0 |
| 92 | 92 | 0 |
| 93 | 93 | 0 |
| 94 | 94 | 0 |
| 95 | 95 | 0 |
| 96 | 96 | 0 |
| 97 | 65 | 0 |
| 98 | 66 | 0 |
| 99 | 67 | 0 |
| 100 | 68 | 0 |
| 101 | 69 | 0 |
| 102 | 70 | 0 |
| 103 | 71 | 0 |
| 104 | 72 | 0 |
| 105 | 73 | 0 |
| 106 | 74 | 0 |
| 107 | 75 | 0 |
| 108 | 76 | 0 |
| 109 | 77 | 0 |
| 110 | 78 | 0 |
| 111 | 79 | 0 |
| 112 | 80 | 0 |
| 113 | 81 | 0 |
| 114 | 82 | 0 |
| 115 | 83 | 0 |
| 116 | 84 | 0 |
| 117 | 85 | 0 |
| 118 | 86 | 0 |
| 119 | 87 | 0 |
| 120 | 88 | 0 |
| 121 | 89 | 0 |
| 122 | 90 | 0 |
| 123 | 123 | 0 |
| 124 | 124 | 0 |
| 125 | 125 | 0 |
| 126 | 126 | 0 |
| 127 | 0 | 0 |
| 128 | 0 | 0 |
| 129 | 0 | 0 |
| 130 | 0 | 0 |
| 131 | 0 | 0 |
| 132 | 0 | 0 |
| 133 | 0 | 0 |
| 134 | 0 | 0 |
| 135 | 0 | 0 |
| 136 | 0 | 0 |
| 137 | 0 | 0 |
| 138 | 0 | 0 |
| 139 | 0 | 0 |
| 140 | 0 | 0 |
| 141 | 0 | 0 |
| 142 | 0 | 0 |
| 143 | 0 | 0 |
| 144 | 0 | 0 |
| 145 | 0 | 0 |
| 146 | 0 | 0 |
| 147 | 0 | 0 |
| 148 | 0 | 0 |
| 149 | 0 | 0 |
| 150 | 0 | 0 |
| 151 | 0 | 0 |
| 152 | 0 | 0 |
| 153 | 0 | 0 |
| 154 | 0 | 0 |
| 155 | 0 | 0 |
| 156 | 0 | 0 |
| 157 | 0 | 0 |
| 158 | 0 | 0 |
| 159 | 0 | 0 |

APPENDIX J: MATCH ENCODING TABLE (LANGUAGE 3)

| | | |
|---|---|---|
| 160 | 32 | 0 |
| 161 | 161 | 0 |
| 162 | 162 | 0 |
| 163 | 163 | 0 |
| 164 | 164 | 0 |
| 165 | 165 | 0 |
| 166 | 166 | 0 |
| 167 | 167 | 0 |
| 168 | 168 | 0 |
| 169 | 169 | 0 |
| 170 | 170 | 0 |
| 171 | 171 | 0 |
| 172 | 172 | 0 |
| 173 | 45 | 0 |
| 174 | 174 | 0 |
| 175 | 175 | 0 |
| 176 | 176 | 0 |
| 177 | 177 | 0 |
| 178 | 178 | 0 |
| 179 | 179 | 0 |
| 180 | 180 | 0 |
| 181 | 181 | 0 |
| 182 | 182 | 0 |
| 183 | 183 | 0 |
| 184 | 184 | 0 |
| 185 | 185 | 0 |
| 186 | 186 | 0 |
| 187 | 187 | 0 |
| 188 | 188 | 0 |
| 189 | 189 | 0 |
| 190 | 190 | 0 |
| 191 | 191 | 0 |
| 192 | 65 | 0 |
| 193 | 65 | 0 |
| 194 | 65 | 0 |
| 195 | 65 | 0 |
| 196 | 196 | 0 |
| 197 | 65 | 0 |
| 198 | 65 | 69 |
| 199 | 67 | 0 |
| 200 | 69 | 0 |
| 201 | 69 | 0 |
| 202 | 69 | 0 |
| 203 | 69 | 0 |
| 204 | 73 | 0 |
| 205 | 73 | 0 |
| 206 | 73 | 0 |
| 207 | 73 | 0 |
| 208 | 68 | 0 |
| 209 | 78 | 0 |
| 210 | 79 | 0 |
| 211 | 79 | 0 |
| 212 | 79 | 0 |
| 213 | 79 | 0 |
| 214 | 214 | 0 |
| 215 | 215 | 0 |
| 216 | 79 | 0 |
| 217 | 85 | 0 |
| 218 | 85 | 0 |
| 219 | 85 | 0 |
| 220 | 220 | 0 |
| 221 | 89 | 0 |
| 222 | 80 | 0 |
| 223 | 223 | 0 |
| 224 | 65 | 0 |
| 225 | 65 | 0 |
| 226 | 65 | 0 |
| 227 | 65 | 0 |
| 228 | 196 | 0 |
| 229 | 65 | 0 |
| 230 | 65 | 69 |
| 231 | 67 | 0 |
| 232 | 69 | 0 |
| 233 | 69 | 0 |
| 234 | 69 | 0 |
| 235 | 69 | 0 |
| 236 | 73 | 0 |
| 237 | 73 | 0 |
| 238 | 73 | 0 |
| 239 | 73 | 0 |
| 240 | 68 | 0 |
| 241 | 78 | 0 |
| 242 | 79 | 0 |
| 243 | 79 | 0 |
| 244 | 79 | 0 |
| 245 | 79 | 0 |
| 246 | 214 | 0 |
| 247 | 247 | 0 |
| 248 | 79 | 0 |
| 249 | 85 | 0 |
| 250 | 85 | 0 |
| 251 | 85 | 0 |
| 252 | 220 | 0 |
| 253 | 89 | 0 |
| 254 | 80 | 0 |
| 255 | 89 | 0 |

APPENDIX K: ACCENT PRIORITY ENCODING TABLE

| | | |
|---|---|---|
| 0 | 255 | 255 |
| 1 | 255 | 255 |
| 2 | 255 | 255 |
| 3 | 255 | 255 |
| 4 | 255 | 255 |
| 5 | 255 | 255 |
| 6 | 255 | 255 |
| 7 | 255 | 255 |
| 8 | 255 | 255 |
| 9 | 255 | 255 |
| 12 | 255 | 255 |
| 11 | 255 | 255 |
| 12 | 255 | 255 |
| 13 | 255 | 255 |
| 14 | 255 | 255 |
| 15 | 255 | 255 |
| 16 | 255 | 255 |
| 17 | 255 | 255 |
| 18 | 255 | 255 |
| 19 | 255 | 255 |
| 20 | 255 | 255 |
| 21 | 255 | 255 |
| 22 | 255 | 255 |
| 23 | 255 | 255 |
| 24 | 255 | 255 |
| 25 | 255 | 255 |
| 26 | 255 | 255 |
| 27 | 255 | 255 |
| 28 | 255 | 255 |
| 29 | 255 | 255 |
| 30 | 255 | 255 |
| 31 | 255 | 255 |
| 32 | 255 | 255 |
| 33 | 255 | 255 |
| 34 | 255 | 255 |
| 35 | 255 | 255 |
| 36 | 255 | 255 |
| 37 | 255 | 255 |
| 38 | 255 | 255 |
| 39 | 255 | 255 |
| 40 | 255 | 255 |
| 41 | 255 | 255 |
| 42 | 255 | 255 |
| 43 | 255 | 255 |
| 44 | 255 | 255 |
| 45 | 255 | 255 |
| 46 | 255 | 255 |
| 47 | 255 | 255 |
| 48 | 255 | 255 |
| 49 | 255 | 255 |
| 50 | 255 | 255 |
| 51 | 255 | 255 |
| 52 | 255 | 255 |
| 53 | 255 | 255 |
| 54 | 255 | 255 |
| 55 | 255 | 255 |
| 56 | 255 | 255 |
| 57 | 255 | 255 |

APPENDIX K: ACCENT PRIORITY ENCODING TABLE

| | | |
|---|---|---|
| 58 | 255 | 255 |
| 59 | 255 | 255 |
| 60 | 255 | 255 |
| 61 | 255 | 255 |
| 62 | 255 | 255 |
| 63 | 255 | 255 |
| 64 | 255 | 255 |
| 65 | 0 | 255 |
| 66 | 255 | 255 |
| 67 | 0 | 255 |
| 68 | 0 | 255 |
| 69 | 0 | 255 |
| 70 | 255 | 255 |
| 71 | 255 | 255 |
| 72 | 255 | 255 |
| 73 | 0 | 255 |
| 74 | 255 | 255 |
| 75 | 255 | 255 |
| 76 | 255 | 255 |
| 77 | 255 | 255 |
| 78 | 0 | 255 |
| 79 | 0 | 255 |
| 80 | 0 | 255 |
| 81 | 255 | 255 |
| 82 | 255 | 255 |
| 83 | 255 | 255 |
| 84 | 255 | 255 |
| 85 | 0 | 255 |
| 86 | 255 | 255 |
| 87 | 255 | 255 |
| 88 | 255 | 255 |
| 89 | 0 | 255 |
| 90 | 255 | 255 |
| 91 | 255 | 255 |
| 92 | 255 | 255 |
| 93 | 255 | 255 |
| 94 | 255 | 255 |
| 95 | 255 | 255 |
| 96 | 255 | 255 |
| 97 | 0 | 255 |
| 98 | 255 | 255 |
| 99 | 0 | 255 |
| 100 | 0 | 255 |
| 101 | 0 | 255 |
| 102 | 255 | 255 |
| 103 | 255 | 255 |
| 104 | 255 | 255 |
| 105 | 0 | 255 |
| 106 | 255 | 255 |
| 107 | 255 | 255 |
| 108 | 255 | 255 |
| 109 | 255 | 255 |
| 110 | 0 | 255 |
| 111 | 0 | 255 |
| 112 | 0 | 255 |
| 113 | 255 | 255 |
| 114 | 255 | 255 |
| 115 | 255 | 255 |
| 116 | 255 | 255 |
| 117 | 0 | 255 |
| 118 | 255 | 255 |
| 119 | 255 | 255 |
| 120 | 255 | 255 |
| 121 | 0 | 255 |
| 122 | 255 | 255 |
| 123 | 255 | 255 |
| 124 | 255 | 255 |
| 125 | 255 | 255 |
| 126 | 255 | 255 |
| 127 | 255 | 255 |
| 128 | 255 | 255 |
| 129 | 255 | 255 |
| 130 | 255 | 255 |
| 131 | 255 | 255 |
| 132 | 255 | 255 |
| 133 | 255 | 255 |
| 134 | 255 | 255 |
| 135 | 255 | 255 |
| 136 | 255 | 255 |
| 137 | 255 | 255 |
| 138 | 255 | 255 |
| 139 | 255 | 255 |
| 140 | 255 | 255 |
| 141 | 255 | 255 |
| 142 | 255 | 255 |
| 143 | 255 | 255 |
| 144 | 255 | 255 |
| 145 | 255 | 255 |
| 146 | 255 | 255 |
| 147 | 255 | 255 |
| 148 | 255 | 255 |
| 149 | 255 | 255 |
| 150 | 255 | 255 |
| 151 | 255 | 255 |
| 152 | 255 | 255 |
| 153 | 255 | 255 |
| 154 | 255 | 255 |
| 155 | 255 | 255 |
| 156 | 255 | 255 |
| 157 | 255 | 255 |
| 158 | 255 | 255 |
| 159 | 255 | 255 |
| 160 | 255 | 255 |
| 161 | 255 | 255 |
| 162 | 255 | 255 |
| 163 | 255 | 255 |
| 164 | 255 | 255 |
| 165 | 255 | 255 |
| 166 | 255 | 255 |
| 167 | 255 | 255 |
| 168 | 255 | 255 |
| 169 | 255 | 255 |
| 170 | 255 | 255 |
| 171 | 255 | 255 |
| 172 | 255 | 255 |
| 173 | 255 | 255 |
| 174 | 255 | 255 |
| 175 | 255 | 255 |
| 176 | 255 | 255 |
| 177 | 255 | 255 |
| 178 | 255 | 255 |
| 179 | 255 | 255 |
| 180 | 255 | 255 |
| 181 | 255 | 255 |
| 182 | 255 | 255 |
| 183 | 255 | 255 |
| 184 | 255 | 255 |
| 185 | 255 | 255 |
| 186 | 255 | 255 |
| 187 | 255 | 255 |
| 188 | 255 | 255 |
| 189 | 255 | 255 |
| 190 | 255 | 255 |
| 191 | 255 | 255 |
| 192 | 2 | 255 |
| 193 | 1 | 255 |
| 194 | 3 | 255 |
| 195 | 4 | 255 |
| 196 | 5 | 255 |
| 197 | 6 | 255 |
| 198 | 0 | 0 |
| 199 | 7 | 255 |
| 200 | 2 | 255 |
| 201 | 1 | 255 |
| 202 | 3 | 255 |
| 203 | 5 | 255 |
| 204 | 2 | 255 |
| 205 | 1 | 255 |
| 206 | 3 | 255 |
| 207 | 5 | 255 |
| 208 | 8 | 255 |
| 209 | 4 | 255 |
| 210 | 2 | 255 |
| 211 | 1 | 255 |
| 212 | 3 | 255 |
| 213 | 4 | 255 |
| 214 | 5 | 255 |
| 215 | 255 | 255 |
| 216 | 9 | 255 |
| 217 | 2 | 255 |
| 218 | 1 | 255 |
| 219 | 3 | 255 |

-continued

APPENDIX K: ACCENT PRIORITY ENCODING TABLE

| | | |
|---|---|---|
| 220 | 5 | 255 |
| 221 | 1 | 255 |
| 222 | 10 | 255 |
| 223 | 255 | 255 |
| 224 | 2 | 255 |
| 225 | 1 | 255 |
| 226 | 3 | 255 |
| 227 | 4 | 255 |
| 228 | 5 | 255 |
| 229 | 6 | 255 |
| 230 | 0 | 0 |
| 231 | 7 | 255 |
| 232 | 2 | 255 |
| 233 | 1 | 255 |
| 234 | 3 | 255 |
| 235 | 5 | 255 |
| 236 | 2 | 255 |
| 237 | 1 | 255 |
| 238 | 3 | 255 |
| 239 | 5 | 255 |
| 240 | 8 | 255 |
| 241 | 4 | 255 |
| 242 | 2 | 255 |
| 243 | 1 | 255 |
| 244 | 3 | 255 |
| 245 | 4 | 255 |
| 246 | 5 | 255 |
| 247 | 255 | 255 |
| 248 | 9 | 255 |
| 249 | 2 | 255 |
| 250 | 1 | 255 |
| 251 | 3 | 255 |
| 252 | 5 | 255 |
| 253 | 1 | 255 |
| 254 | 10 | 255 |
| 255 | 5 | 255 |

APPENDIX L:
PSEUDOCODE FOR SORT/MATCH/ACCENT ENCODING

```
{ ---------------------------------------------------------------- +
+                                                                  +
+  Data Structure Declaration                                      +
+                                                                  +
+  SortTable: Sort Encoding Table                                  +
+  MatchTable: Match Encoding Table                                +
+  AccentTable: Accent Priority Encoding Table                     +
+ ---------------------------------------------------------------- }
TYPE
    t_:language  = (English, French, Swedish, German,
                    Dutch, Danish, Faeroese, Finnish,
                    Portuguese, Irish, Spanish, Icelandic,
                    Italian, Norwegian);
    sortRec      = PACKED RECORD
                     PrevSValue: CHAR; { 21 }
                     FirstSValue: CHAR; { 22 }
                     SecondSValue: CHAR; { 23 }
                   END;
    sorttab      = PACKED ARRAY{CHAR} OF
                     sortRec;
    matchRec     = PACKED RECORD
                     FirstMValue: CHAR; { 32 }
                     SecondMValue: CHAR; { 33 }
                   END;
    matchtab     = PACKED ARRAY{CHAR}
                     of matchRec;
    accentrec    = PACKED RECORD
                     FirstAValue: CHAR; { 27 }
                     SecondAValue: CHAR; { 28 }
                   END;
{variable declarations}
VAR
    SortTable:   ARRAY [t_language] OF sorttab;
    MatchTable:  ARRAY [t_language] OF matchtb;
    AccentTable: ARRAY [CHAR] OF accentrec;
{ ---------------------------------------------------------------- +
+  Encode_SortKey converts the input string 'Str' into the        +
+  encoded sort key for the language in 'lang'.                   +
```

-continued

APPENDIX L:
PSEUDOCODE FOR SORT/MATCH/ACCENT ENCODING

```
+  The procedure uses the Sort Encoding Tables.                   +
+ ---------------------------------------------------------------- }
```

What is claimed is:

1. A computer implemented method of operation for a multilingual ordered database having a data store for storing multilingual data, and an index of sort keys for facilitating access to said data store, said computer implemented method comprising the steps of:

a) receiving information, in the form of words based upon characters from a multilingual alphabet, to be stored in said database;

b) encoding, according to predetermined criteria, said words to form one sort key for each word for each language to be supported by said database, wherein each of said sort keys for each word for each language are different from each other, dependent on language composition;

c) storing said information in a known location in said data store;

d) storing said sort keys in sorted order in said index along with an indication of the known location of the corresponding information in said data store; and said predetermined criteria includes a master alphabetical sort order for all the languages supported by a multilingual character set and used in the database.

2. The method of claim 1 wherein said predetermined criteria includes both a master alphabetical sort order for all the languages supported by a multilingual character set and used in the database, and accent priority.

3. The method of claim 1 further including, after the step of encoding one sort key for each language, the step of consolidating said sort keys so formed to make a consolidated sort key, such that duplicate sort keys for the same entry in said data store do not exist and, appending to said consolidated sort key, a mark indicative of each language to which said consolidated sort key is applicable.

4. The method of claims 1, 2, or 3 further including the step of retrieving multilingual data from said database, sorted according to the user's language, without the step of sorting the retrieved data.

5. The method of claims 1, 2, or 3 further including the step of retrieving multilingual data from said database, sorted according to the user's language, without the step of sorting the retrieved data and further including the step of transliterating foreign characters into characters supported by the language under consideration.

6. A computer implemented method of operation for a multilingual ordered database having a data store for storing multilingual data, and an index of sort keys for facilitating access to said data store, said computer implemented method comprising the steps of:

a) accepting input data, in the form of words based upon characters from a multilingual alphabet;

b) storing said input data in a known location in said data store;

c) encoding at least a portion of said input data via encoding tables, such that one sort key is formed for each word per language supported, wherein each of said sort keys for each word per language supported are different from each other, dependent on language composition;

d) inserting said sort keys so formed into said index in numerical order along with an indication of the known location of the corresponding data in said data store; and said encoding tables are based upon a master alphabetical sort order for all the languages supported by a multilingual character set and used in the database.

7. The method of claim 6 further including, after the step of encoding one sort key for each language, the step of consolidating said sort keys so formed to make a consolidated sort key, such that duplicate sort keys for the same entry in said data store do not exist and, appending to said consolidated sort key, a mark indicative of each language to which said consolidated sort key is applicable.

8. A computer implemented method of operation for a multilingual ordered database having a data store for storing multilingual data, and an index of sort keys for facilitating access to said data store, said computer implemented method comprising the steps of:

a) accepting input data, in the form of words based upon characters from a multilingual alphabet;

b) storing said input data in a known location in said data store;

c) encoding at least a portion of said input data via encoding tables, such that one sort key is formed for each word per language supported, wherein each of said sort keys for each word per language supported are different from each other, dependent on language composition;

d) inserting said sort keys so formed into said index in numerical order along with an indication of the known location of the corresponding data in said data store;

e) if other sort keys stored in said index have the same numerical value as does a newly encoding sort key, then the data corresponding to all said sort keys having said same numerical value, is extracted from said data store and is encoded using an accent priority encoding table;

f) all the sort keys of step (e) are then sorted in the numerical order indicated by the accent encoding table and are then stored in said index in said order; and said encoding tables are based upon a master alphabetical sort order for all the languages supported by a multilingual character set and used in the database.

9. The method of claim 8 further including, after the step of encoding one sort key for each language, the step of consolidating said sort keys so formed to make a consolidated sort key, such that duplicate sort keys for the same entry in said data stored do not exit and, appending to said consolidated sort key, a mark indicative of each language to which said consolidated sort key is applicable.

10. A computer implemented method of operation for a multilingual ordered database having a data store for storing multilingual data, and an index of index sort keys for facilitating access to said data store, said computer implemented method, including the insertion of data into, and the extraction of data from, said database, comprising the following steps:

a) accepting first input data to be stored in said database;

b) storing said first input data in a known location in said data store;

c) encoding at least a portion of said first input data via sort encoding tables, such that one index sort key is formed per language supported;

d) inserting said index sort keys stored in said index have the same numerical value as does a newly encoded index sort key, then the data corresponding to all said index sort keys having said same numerical value, is extracted from said data store and is encoded using an accent priority encoding table;

f) all the index sort keys of step (e) are then sorted in the numerical order indicated by the accent encoding table and are then stored in said index in said order;

g) accepting second input data, the presence of which is to be searched for in said database;

h) encoding said second input data via a sort encoding table corresponding to the language of said user to produce a search sort key;

i) comparing said search sort key with the index sort keys of said index to find any index sort keys in said index that are identical to said search sort key and extracting, as found data, data from said data store corresponding to any index sort keys that are identical to said search sort key;

j) encoding at least a portion of each data entry extracted during step (i) and also encoding said second input data via a match encoding table corresponding to the language of said user to produce encoded match keys;

k) comparing the match key corresponding to said second input data with the match keys corresponding to said second input data with the match keys corresponding to said found data to find any that are identical, and extracting data from said data store corresponding to any match keys from said found data that are identical to the match key corresponding to said second input data.

11. The method of claim 10 wherein said sort encoding tables are based upon a master alphabetical sort order for all the languages supported by a multilingual character set and used in the database.

12. The method of claim 11 further including, after the step of encoding one sort key for each language, the step of consolidating said sort keys so formed to make a consolidated sort key, such that duplicate sort keys for the same entry in said data store do not exist and, appending to said consolidated sort key, a mark indicative of each language to which said consolidated sort key is applicable.

13. A computer implemented method of operation for a multilingual ordered database having a data store for storing multilingual data, and an index of index sort keys for facilitating access to said data store, said computer implemented method including the extraction of data from said database, in response to a request from a user, according to the following steps:

a) accepting input data, in the form of words based upon characters from a multilingual alphabet;

b) encoding said input data via a sort encoding table corresponding to the language of said user to produce a search sort key;

c) comparing said search sort key with the index sort keys of said index, each of said index sort keys representing an encoded word based upon characters from a multilingual alphabet, to find any index sort keys in said index that are identical to said search sort key and identifying any that are the same;

d) extracting the data corresponding to said index sort keys identified as being the same as said search sort key;

e) encoding said data from step (d) and said input data via a match encoding table corresponding to the language of said user to produce encoded match keys;

f) comparing the match key corresponding to said input data with the match keys corresponding to said found data to find any match keys that are identical to the match key corresponding to said input data and extracting data from said data store corresponding to any match keys from said found data that are identical to the match key corresponding to said second input data; and said sort encoding tables is based upon a master alphabetical sort order for all the languages supported by a multilingual character set and used in the database.

14. A computer implemented method of operation for a multilingual ordered database having a data store for storing multilingual data, and an index of index sort keys for facilitating access to said data store, said computer implemented method including the extraction of data from said database, in response to a request from a user, according to the following steps:

a) accepting input data, in the form of words based upon characters from a multilingual alphabet;

b) encoding said input data via a sort encoding table corresponding to the language of said user to produce a search sort key;

c) comparing said search sort key with the index sort keys of said index, each of said index sort keys representing an encoded word based upon characters from a multilingual alphabet, to find any index sort keys in said index that are identical to said search sort key and identifying any that are the same;

d) extracting the data corresponding to said index sort keys identified as being the same as said search sort key; and said sort encoding tables is based upon a master alphabetical sort order for all the languages supported by a multilingual character set and used in the database.

* * * * *